United States Patent
Kumagai et al.

(10) Patent No.: US 12,068,788 B2
(45) Date of Patent: Aug. 20, 2024

(54) RECEIVER CIRCUIT FOR OPTICAL COMMUNICATION

(71) Applicant: Sumitomo Electric Industries, Ltd., Osaka (JP)

(72) Inventors: Seiji Kumagai, Osaka (JP); Yoshiyuki Sugimoto, Osaka (JP); Keiji Tanaka, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 93 days.

(21) Appl. No.: 17/852,736

(22) Filed: Jun. 29, 2022

(65) Prior Publication Data

US 2023/0011340 A1    Jan. 12, 2023

(30) Foreign Application Priority Data

Jul. 6, 2021 (JP) .................................. 2021-112203

(51) Int. Cl.
    *H04B 10/60*    (2013.01)
(52) U.S. Cl.
    CPC .................................... *H04B 10/60* (2013.01)
(58) Field of Classification Search
    CPC . H04B 10/60; H04B 10/6973; H04B 10/6931
    See application file for complete search history.

(56) References Cited

U.S. PATENT DOCUMENTS

| 5,801,588 | A  | * | 9/1998  | Nishiyama | H03F 3/082    |
|           |    |   |         |           | 250/214 AG    |
| 6,188,059 | B1 | * | 2/2001  | Nishiyama | H04B 10/6911  |
|           |    |   |         |           | 250/214 R     |
| 6,333,804 | B1 | * | 12/2001 | Nishiyama | H04B 10/69    |
|           |    |   |         |           | 398/208       |
| 6,522,459 | B1 | * | 2/2003  | Pease     | H01S 3/06758  |
|           |    |   |         |           | 359/337       |
| 7,394,995 | B2 | * | 7/2008  | Audic     | H04B 10/673   |
|           |    |   |         |           | 398/208       |

(Continued)

FOREIGN PATENT DOCUMENTS

| CN | 103281132 B | * | 9/2016  | ......... H01S 5/02407 |
| CN | 106253988 A | * | 12/2016 | ......... H01S 5/02407 |

(Continued)

*Primary Examiner* — Berhanu Tadese
(74) *Attorney, Agent, or Firm* — Volpe Koenig

(57) ABSTRACT

A receiver circuit includes an input terminal for receiving an input current signal, a transimpedance amplifier having an input node, the transimpedance amplifier converting a current signal input to the input node into a voltage signal, an inductor having a first terminal and a second terminal, and a bypass circuit. The first terminal is coupled to the input terminal and the second terminal is coupled to the input node. The bypass circuit includes a bias circuit supplying a bias voltage, a first variable resistor coupled between the first terminal and the bias circuit, a second variable resistor coupled between the second terminal and the bias circuit, and an impedance adjustment circuit including a resistor and a capacitor connected in parallel to the resistor, the impedance adjustment circuit connected in series to at least one of the first variable resistor and the second variable resistor.

13 Claims, 13 Drawing Sheets

(56) References Cited

U.S. PATENT DOCUMENTS

| | | | | |
|---|---|---|---|---|
| 8,054,136 B2* | 11/2011 | Hara | H03F 3/72 | 330/308 |
| 8,358,938 B2* | 1/2013 | Tanaka | H04B 10/07955 | 398/202 |
| 8,390,383 B2* | 3/2013 | Hara | H03G 3/3084 | 330/141 |
| 8,466,741 B2* | 6/2013 | Umeda | H03F 1/08 | 330/96 |
| 8,969,989 B2* | 3/2015 | Yoneda | H01L 31/105 | 257/432 |
| 9,354,113 B1* | 5/2016 | Hayat | H04B 10/693 | |
| 9,366,835 B2* | 6/2016 | Masuyama | G02B 6/4295 | |
| 9,496,826 B2* | 11/2016 | Sugimoto | H03F 1/0205 | |
| 9,544,063 B2* | 1/2017 | Tateiwa | H04B 10/671 | |
| 9,575,257 B2* | 2/2017 | Furuya | G02B 6/3668 | |
| 9,577,753 B2* | 2/2017 | Sugimoto | H04B 10/6933 | |
| 9,638,725 B2* | 5/2017 | Tanaka | G01R 19/0092 | |
| 9,660,601 B2* | 5/2017 | Tanaka | H03F 1/083 | |
| 9,780,884 B2* | 10/2017 | Takechi | H04B 10/614 | |
| 9,780,885 B2* | 10/2017 | Takechi | H04B 10/614 | |
| 9,891,385 B2* | 2/2018 | Tang | G02B 6/4286 | |
| 9,954,622 B2* | 4/2018 | Sugimoto | H04B 10/272 | |
| 9,977,204 B2* | 5/2018 | Oomori | G02B 6/4292 | |
| 9,983,372 B2* | 5/2018 | Oomori | G02B 6/12004 | |
| 10,103,814 B2* | 10/2018 | Funada | H04B 10/67 | |
| 10,243,672 B2* | 3/2019 | Pang | G02F 1/225 | |
| 10,291,330 B2* | 5/2019 | Yuda | H04B 10/40 | |
| 10,326,416 B2* | 6/2019 | Sugimoto | H03F 1/34 | |
| 10,353,159 B2* | 7/2019 | Hirano | G02B 6/426 | |
| 10,527,805 B2* | 1/2020 | Mizuno | G02B 6/4246 | |
| 10,554,310 B2* | 2/2020 | Pang | H04B 10/66 | |
| 10,554,311 B2* | 2/2020 | Pang | H04B 10/25073 | |
| 10,564,370 B2* | 2/2020 | Hirano | G02B 6/421 | |
| 10,594,405 B2* | 3/2020 | Oe | H04B 10/6931 | |
| 10,608,599 B2* | 3/2020 | Sugimoto | H03F 3/45183 | |
| 10,651,939 B2* | 5/2020 | Tanaka | H04L 12/40 | |
| 10,715,258 B1* | 7/2020 | Melikyan | H04J 14/06 | |
| 10,727,953 B2* | 7/2020 | Mii | G02B 6/4248 | |
| 10,795,080 B1* | 10/2020 | Bao | G02B 6/4214 | |
| 10,812,192 B2* | 10/2020 | Tanaka | G02B 6/36 | |
| 10,819,425 B2* | 10/2020 | Tanaka | H04B 10/66 | |
| 10,819,442 B2* | 10/2020 | Pang | G02B 6/4246 | |
| 10,833,773 B2* | 11/2020 | Pang | H04B 10/25 | |
| 11,349,444 B2* | 5/2022 | Tanaka | H03F 3/45197 | |
| 11,362,629 B2* | 6/2022 | Itabashi | H03F 3/082 | |
| 11,411,542 B2* | 8/2022 | Tanaka | H03F 3/45179 | |
| 11,486,760 B2* | 11/2022 | Kumagai | H03F 1/56 | |
| 11,595,010 B2* | 2/2023 | Itabashi | H04B 10/697 | |
| 11,601,203 B2* | 3/2023 | Tanaka | H04B 10/69 | |
| 2008/0002993 A1* | 1/2008 | Kirkpatrick | H04B 10/697 | 398/202 |
| 2010/0231295 A1* | 9/2010 | Hara | H03F 3/72 | 330/185 |
| 2011/0249946 A1* | 10/2011 | Nakanishi | G02B 6/4246 | 385/88 |
| 2014/0332670 A1* | 11/2014 | Tateiwa | H03F 3/08 | 250/208.2 |
| 2015/0270808 A1* | 9/2015 | Sugimoto | H03F 3/45475 | 330/294 |
| 2015/0372648 A1* | 12/2015 | Sugimoto | H04B 10/272 | 330/2 |
| 2016/0329869 A1* | 11/2016 | Tanaka | H03F 3/45085 | |
| 2018/0088282 A1* | 3/2018 | Hirano | G02B 6/3652 | |
| 2018/0252876 A1* | 9/2018 | Hirano | G02B 6/4298 | |
| 2018/0294889 A1* | 10/2018 | Oe | H04B 10/6931 | |
| 2019/0052236 A1* | 2/2019 | Sugimoto | H03F 3/082 | |
| 2019/0238232 A1* | 8/2019 | Tanaka | H04L 12/413 | |
| 2019/0302377 A1* | 10/2019 | Yamada | G02B 6/4214 | |
| 2019/0319594 A1* | 10/2019 | Nakayama | H05K 1/181 | |
| 2020/0007087 A1* | 1/2020 | Sugimoto | H03F 3/087 | |
| 2020/0014463 A1* | 1/2020 | Tanaka | H03F 1/3211 | |
| 2020/0145114 A1* | 5/2020 | Tatsumi | H04B 10/6911 | |
| 2020/0213011 A1* | 7/2020 | Tanaka | H04B 10/0779 | |
| 2020/0274690 A1* | 8/2020 | Tanaka | H04B 10/40 | |
| 2020/0322062 A1* | 10/2020 | Mii | H04B 10/506 | |
| 2020/0408993 A1* | 12/2020 | Nakayama | G02B 6/4214 | |
| 2021/0126602 A1* | 4/2021 | Itabashi | H04B 10/691 | |
| 2023/0011340 A1* | 1/2023 | Kumagai | H04B 10/6973 | |
| 2023/0091751 A1* | 3/2023 | Velazco | H04B 10/11 | 398/121 |
| 2023/0092750 A1* | 3/2023 | Sugimoto | H03F 3/45475 | 330/252 |

FOREIGN PATENT DOCUMENTS

| | | | | |
|---|---|---|---|---|
| CN | 106253988 B | * | 2/2019 | H01S 5/02407 |
| CN | 110708032 A | * | 1/2020 | H03F 1/0277 |
| JP | 2010213128 A | * | 9/2010 | H03F 1/083 |
| JP | 2012010107 A | * | 1/2012 | H03G 3/3084 |
| JP | 2012060436 A | * | 3/2012 | H03G 3/3084 |
| JP | 2013138400 A | * | 7/2013 | H03F 3/45085 |
| JP | 5280256 B2 | * | 9/2013 | H03F 1/083 |
| JP | 2015186013 A | * | 10/2015 | H03F 1/0205 |
| JP | 2016009971 A | * | 1/2016 | H03F 1/083 |
| JP | 2018191068 A | * | 11/2018 | H03F 1/0233 |
| JP | 2019036817 A | * | 3/2019 | H03F 3/082 |
| JP | 2019216346 A | * | 12/2019 | H03F 3/082 |
| JP | 2020-077956 A | | 5/2020 | |
| JP | 2021069025 A | * | 4/2021 | H03F 1/086 |

* cited by examiner

RECEIVER CIRCUIT FOR OPTICAL COMMUNICATION

CROSS-REFERENCE TO RELATED APPLICATION

This application claims priority from Japanese Patent Application No. 2021-112203, filed on Jul. 6, 2021, the entire subject matter of which is incorporated herein by reference.

TECHNICAL FIELD

The present disclosure relates to a receiver circuit for optical communication.

BACKGROUND

With an increase in speed and capacity of an optical communication system, a digital coherent optical transmission system is used for long-distance transmission. In the digital coherent optical transmission communication, after an analog electric signal converted from an optical signal by an optical receiver is converted into a digital electric signal by a high-speed A/D converter, digital signal processing is performed to compensate for various distortions generated in transmission of the optical signal through an optical fiber. The optical receiver is required to have linearity in a wide input power range of an optical signal in conversion to an analog electric signal and in amplification.

In the optical receiver circuit described in Japanese Unexamined Patent Application Publication No. 2020-77956, a variable resistor is provided at an input of a transimpedance amplifier in order to realize a linear amplification operation in a wide dynamic range.

SUMMARY

A receiver circuit configured to generate a voltage signal in accordance with an input current signal, the receiver circuit includes an input terminal for receiving the input current signal, a transimpedance amplifier having an input node, the transimpedance amplifier being configured to convert a current signal into the voltage signal, the current signal being input to the input node, an inductor having a first terminal and a second terminal, the first terminal being coupled to the input terminal, the second terminal being coupled to the input node, and a bypass circuit. The bypass circuit includes a bias circuit configured to supply a bias voltage, a first variable resistor coupled between the first terminal and the bias circuit, a second variable resistor coupled between the second terminal and the bias circuit, and an impedance adjustment circuit including a resistor and a capacitor connected in parallel to the resistor, the impedance adjustment circuit being connected in series to at least one of the first variable resistor and the second variable resistor.

DETAILED DESCRIPTION

Specific examples of receiver circuits according to embodiments of the present disclosure will be described below with reference to the drawings. It should be noted that the present disclosure is not limited to these examples, but is defined by the scope of claims, and is intended to include all modifications within the meaning and range equivalent to the scope of claims.

Figure 1:
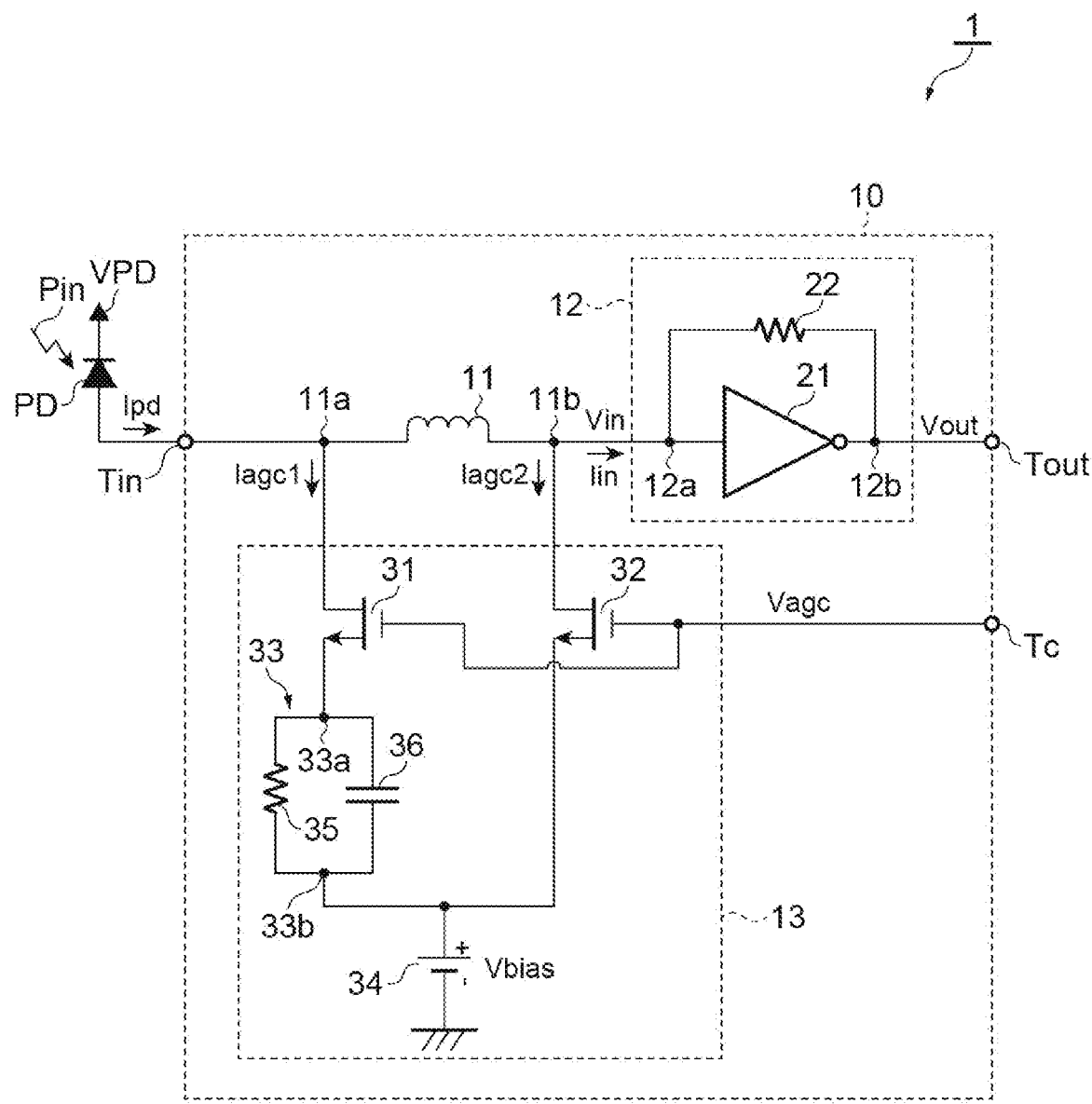
FIG. 1 is a diagram illustrating a configuration of an optical receiver including a receiver circuit according to an embodiment.

FIG. 1 is a diagram illustrating a configuration of an optical receiver including a receiver circuit according to an embodiment. An optical receiver 1 shown in FIG. 1 receives an optical signal Pin transmitted from an optical transmitter (not shown). The optical receiver 1 includes a photodetector PD and a receiver circuit 10. The optical receiver 1 is used in, for example, a receiving unit of a digital coherent optical communication system. The photodetector PD receives the optical signal Pin and generates a photocurrent Ipd (input current signal) in accordance with the optical signal Pin. The photocurrent Ipd may include an alternating current (AC) component corresponding to a modulated signal and a direct current (DC) component corresponding to an average power. When a signal intensity (optical power) of the optical signal Pin increases, the alternating current component and the direct current component of the photocurrent Ipd increase, and when the signal intensity (optical power) of the optical signal Pin decreases, the alternating current component and the direct current component of the photocurrent Ipd decrease. The photodetector PD is, for example, a photodiode or an avalanche photodiode. One terminal (for example, a cathode) of the photodetector PD is electrically coupled to a power supply that supplies a predetermined bias voltage VPD, and the other terminal (for example, an anode) of the photodetector PD outputs the photocurrent Ipd.

Note that "electrically coupled" means coupled in a state in which a signal can be transmitted and a current and a voltage can be supplied between both electrically coupled components. Therefore, "electrically coupled" can include a case of being directly connected by a wire and a case of being indirectly connected via another electric element. "Electrically coupled" is used in the same sense in the following description.

The receiver circuit 10 is, for example, a circuit that generates a voltage signal Vout in accordance with the photocurrent Ipd. The receiver circuit 10 is configured as, for example, an integrated circuit (IC). The receiver circuit 10 is formed on a single semiconductor chip, for example. The receiver circuit 10 includes, for example, an input terminal Tin, an output terminal Tout, and a control terminal Tc. The input terminal Tin is electrically coupled to the anode of the photodetector PD. The photocurrent Ipd is input to the input terminal Tin. The output terminal Tout outputs the voltage signal Vout to the outside of the receiver circuit 10. A control voltage Vagc (control signal) is input to the control terminal Tc. The control voltage Vagc is changed in accordance with the voltage signal Vout. For example, the control voltage Vagc increases as an amplitude of the voltage signal Vout increases. For example, when the receiver circuit 10 is manufactured as one semiconductor integrated device (for example, a semiconductor chip) by a semiconductor process, the input terminal Tin, the output terminal Tout, and the control terminal Tc may be bonding pads formed on the semiconductor chip. When the semiconductor chip in which the receiver circuit 10 is formed is mounted in a package, the input terminal Tin, the output terminal Tout, and the control terminal Tc may be electric terminals provided on an outer surface of the package.

A differential amplifier circuit may be connected to the output terminal Tout of the receiver circuit 10 in order to convert the single-phase voltage signal Vout into a differential signal or further amplify the voltage signal Vout. The receiver circuit 10 may be configured with a control circuit that generates the control voltage Vagc in accordance with the voltage signal Vout. When the receiver circuit 10 is formed on a semiconductor chip together with these peripheral circuits, the output to the outside may be performed not by the output terminal Tout but by a bonding pad formed at the output of the differential amplifier circuit.

The receiver circuit 10 includes an inductor 11, a transimpedance amplifier 12, and a bypass circuit 13.

The inductor 11 is an inductor device having an inductance L1. The inductor 11 is provided to increase a high-frequency gain of the receiver circuit 10. The inductance L1 is set from 100 pH to 500 pH, for example. The inductor 11 has a terminal 11a and a terminal 11b. The terminal 11a is electrically coupled to the input terminal Tin. The terminal 11b is electrically coupled to an input node 12a to be described later. The inductor 11 is disposed on a semiconductor chip together with the transimpedance amplifier 12, for example, and is formed by a metal line (metal wiring) on the semiconductor chip. That is, the inductor 11 corresponds to an inductive component of the metal line that electrically connects the input terminal Tin and the input node 12a. When the inductance L1 having a relatively large value is required, the inductor 11 may be formed as a spiral inductor or a meander inductor on the semiconductor chip, for example.

The transimpedance amplifier 12 is a circuit that converts a current signal Iin into the voltage signal Vout. Specifically, the transimpedance amplifier 12 includes a voltage amplifier 21 and a feedback resistor 22. An input terminal and an output terminal of the voltage amplifier 21 are electrically coupled to each other via the feedback resistor 22. That is, the feedback resistor 22 is electrically coupled between the input and the output of the voltage amplifier 21. The current signal Iin is generated by subtracting bypass currents Iagc1 and Iagc2 from the photocurrent Ipd. The bypass currents Iagc1 and Iagc2 are generated by the bypass circuit 13, which will be described in detail later. The increase and decrease of the voltage signal Vout is inverted with respect to the increase and decrease of the current signal Iin. For example, when a current amount of the current signal Iin increases, a voltage value of the voltage signal Vout decreases.

The voltage amplifier 21 is, for example, an inverting amplifier circuit. When an input voltage (input voltage signal) Vin of the input node 12a increases, the voltage signal Vout decreases, and when the input voltage Vin decreases, the voltage signal Vout increases. The transimpedance amplifier 12 outputs the voltage signal Vout to the outside of the receiver circuit 10 via the output terminal Tout. A gain of the transimpedance amplifier 12 (a ratio of an amount of change in the voltage signal Vout to an amount of change in the current signal Iin) is mainly determined by a resistance (transimpedance) of the feedback resistor 22. The gain of the transimpedance amplifier 12 is obtained by $\Delta Vout/\Delta Iin$, where $\Delta Vout$ is the amount of change in the voltage signal Vout, and $\Delta Iin$ is the amount of change in the current signal Iin that causes the amount of change $\Delta Vout$. An input impedance of the transimpedance amplifier 12 is, for example, about $10\Omega$ to $100\Omega$.

The transimpedance amplifier 12 includes the input node 12a and an output node 12b. The input node 12a includes a connection point between the input terminal of the voltage amplifier 21 and one end of the feedback resistor 22. The input node 12a may be the input terminal of the voltage amplifier 21. That is, the current signal Iin is input to the input node 12a. The output node 12b includes a connection point between the output terminal of the voltage amplifier 21 and the other end of the feedback resistor 22. The output node 12b may be the output terminal of the voltage amplifier 21. That is, the voltage signal Vout is output from the output node 12b.

The bypass circuit 13 is a circuit for performing a gain adjustment for adjusting a gain which is a conversion efficiency from the photocurrent Ipd to the voltage signal Vout. The bypass circuit 13 generates the current signal Iin by subtracting the bypass current (first bypass current) Iagc1 and the bypass current (second bypass current) Iagc2 from the photocurrent Ipd. The bypass circuit 13 includes a transistor 31 (first variable resistor), a transistor 32 (second variable resistor), an impedance adjustment circuit 33, and a bias circuit 34. The bypass circuit 13 changes the bypass currents Iagc1 and Iagc2 in accordance with the control voltage Vagc. The control voltage Vagc is input from, for example, a gain control circuit that generates the control voltage Vagc in accordance with the voltage signal Vout. By changing the bypass currents Iagc1 and Iagc2 in accordance with the voltage signal Vout, an automatic gain control (AGC) can be performed. For example, when the photocurrent Ipd becomes larger than a predetermined value, the bypass currents Iagc1 and Iagc2 are increased to suppress an increase in the current signal Iin. When the photocurrent Ipd is smaller than a predetermined value, the bypass currents Iagc1 and Iagc2 become zero, and the current signal Iin becomes equal to the photocurrent Ipd. Since the gain control circuit can be constructed using prior arts, a detailed description thereof will be omitted.

Each of the transistors 31 and 32 is, for example, a MOSFET which is a field-effect transistor having a metal-oxide-semiconductor (MOS) structure. In the embodiment of the present disclosure, N-channel MOS transistors are used as the transistors 31 and 32. The transistor 31 is electrically coupled between the terminal 11a of the inductor 11 and the bias circuit 34. Specifically, a drain of the transistor 31 is electrically coupled to the terminal 11a of the inductor 11. A source of the transistor 31 is electrically coupled to the bias circuit 34 through the impedance adjustment circuit 33. A gate of the transistor 31 is electrically coupled to the control terminal Tc. The control voltage Vagc is supplied to the gate of the transistor 31.

The transistor 32 is electrically coupled between the terminal 11b of the inductor 11 and the bias circuit 34. In particular, a drain of the transistor 32 is electrically coupled to the terminal 11b of the inductor 11. A source of the transistor 32 is electrically coupled to the bias circuit 34. A gate of the transistor 32 is electrically coupled to the control terminal Tc. The control voltage Vagc is supplied to the gate of the transistor 32. A size (gate width) of the transistor 31 and a size (gate width) of the transistor 32 may be the same or different from each other.

The impedance adjustment circuit 33 includes a resistor 35 and a capacitor 36, and is a circuit in which the resistor 35 and the capacitor 36 are connected in parallel. The impedance adjustment circuit 33 is connected in series to the transistor 31. In the embodiment of the present disclosure, the impedance adjustment circuit 33 is electrically coupled between the transistor 31 and the bias circuit 34. The impedance adjustment circuit 33 includes a node 33a and a node 33b. The node 33a is a connection point between one end of the resistor 35 and one end of the capacitor 36. The node 33b is a connection point between the other end of the resistor 35 and the other end of the capacitor 36. The node 33a is electrically coupled to the source of the transistor 31. The node 33b is electrically coupled to the bias circuit 34. A resistance R1 of the resistor 35 is sufficiently larger than the input impedance of the transimpedance amplifier 12 (input node 12a) and is set to, for example, several hundreds $\Omega$ to several k$\Omega$. A capacitance C1 of the capacitor 36 is set to, for example, several tens fF to several hundreds fF. A method of determining the resistance R1 and the capacitance C1 will be described later.

The bias circuit 34 is a circuit that supplies a bias voltage Vbias. The bias voltage Vbias is, for example, a direct current voltage. The bias circuit 34 has, for example, the same circuit configuration as that of the transimpedance amplifier 12. A voltage value of the bias voltage Vbias is substantially equal to an average value of the input voltage Vin at the input node 12a. By substantially equal is meant that the two values may differ from each other within an acceptable margin of error. For example, if a relative error of the voltage value of the bias voltage Vbias with respect to the average value of the input voltage Vin is within 3%, it may be considered to be substantially equal.

In the bypass circuit 13 configured as described above, the control voltage Vagc input to the control terminal Tc is supplied to the gate of the transistor 31 and the gate of the transistor 32. The bias voltage Vbias is supplied to the source of the transistor 31 via the impedance adjustment circuit 33, and the bias voltage Vbias is supplied to the source of the transistor 32. The input voltage Vin of the input node 12a is applied to the drain of the transistor 31 and the drain of the transistor 32. Since the voltage value of the bias voltage Vbias is substantially equal to the voltage value of the input voltage Vin at the input node 12a, the transistors 31 and 32 operate in a deep triode region (linear region) when the transistors 31 and 32 are in an ON state (the bypass circuit 13 is also referred to as an ON state). A transistor comes into a triode region, when a voltage value obtained by subtracting a threshold voltage of the transistor from a gate-source voltage of the transistor is larger than a drain-source voltage. The word "deep" means the voltage value is quite larger than the drain-source voltage.

In the linear region, when the drain-source voltage of each of the transistors 31 and 32 increases, a drain current also increases in accordance with the increase in the drain-source voltage. In particular, when the drain-source voltage is relatively small, the drain current can be regarded as changing (linearly) in proportion to the drain voltage. A resistance $R_{AGC1}$ (on resistance) of the transistor 31 can be expressed as a ratio of the drain-source voltage (a numerator) to the drain current (a denominator). The resistance $R_{AGC1}$ decreases as the gate-source voltage increases. Since the voltage value of the bias voltage Vbias is constant, the resistance $R_{AGC1}$ changes in accordance with the control voltage Vagc. Similarly, since a resistance $R_{AGC2}$ (on resistance) of the transistor 32 decreases as the gate-source voltage increases, the resistance $R_{AGC2}$ changes in accordance with the control voltage Vagc. That is, each of the transistors 31 and 32 operates as a variable resistor controlled by the control voltage Vagc. The resistance $R_{AGC1}$ is set to, for example, several tens $\Omega$ to several k$\Omega$. The resistance $R_{AGC2}$ is set to, for example, several tens $\Omega$ to several k$\Omega$. In the embodiment of the present disclosure, the resistance $R_{AGC2}$ is set to substantially the same value as the resistance $R_{AGC1}$. Therefore, for example, the gate width of the transistor 31 is set to a value equal to the gate width of the transistor 32.

That is, the transistor 31 is grounded in an alternating-current (AC) analysis by the bias circuit 34, and the transistor 31 is biased in the deep triode region. Since an average potential (direct current potential) of the terminal 11a and an average potential (direct current potential) of the node 33b are substantially the same, a direct current component of the photocurrent Ipd hardly flow into the transistor 31, and a part of alternating current components of the photocurrent Ipd flows into the transistor 31 as the bypass current Iagc1. In other words, the transistor 31 causes the bypass current Iagc1 to flow between the drain and the source of the transistor 31 in accordance with the control voltage Vagc.

Similarly, the transistor 32 is grounded in an alternating-current (AC) analysis by the bias circuit 34, and the transistor 32 is biased in the deep triode region. Since the average potential (direct current potential) of the terminal 11b and a source potential of the transistor 32 are substantially the same, the direct current component of the photocurrent Ipd hardly flow into the transistor 32, and a part of the alternating current components of the photocurrent Ipd flows into the transistor 32 as the bypass current Iagc2. In other words, the transistor 32 allows the bypass current Iagc2 to flow between the drain and the source of the transistor 32 in accordance with the control voltage Vagc.

That is, when the amplitude of the photocurrent Ipd increases, the amplitude of the voltage signal Vout increases. As the amplitude of the voltage signal Vout increases, the control voltage Vagc increases. Since the resistance $R_{AGC1}$ and the resistance $R_{AGC2}$ decrease as the control voltage Vagc increases, a part of the signal components (alternating current components) other than the direct current component of the photocurrent Ipd is subtracted as the bypass currents Iagc1 and Iagc2. As a result, the amplitude of the current signal Iin is suppressed, and the possibility that the transimpedance amplifier 12 is saturated by a large signal input is reduced.

Figure 2:
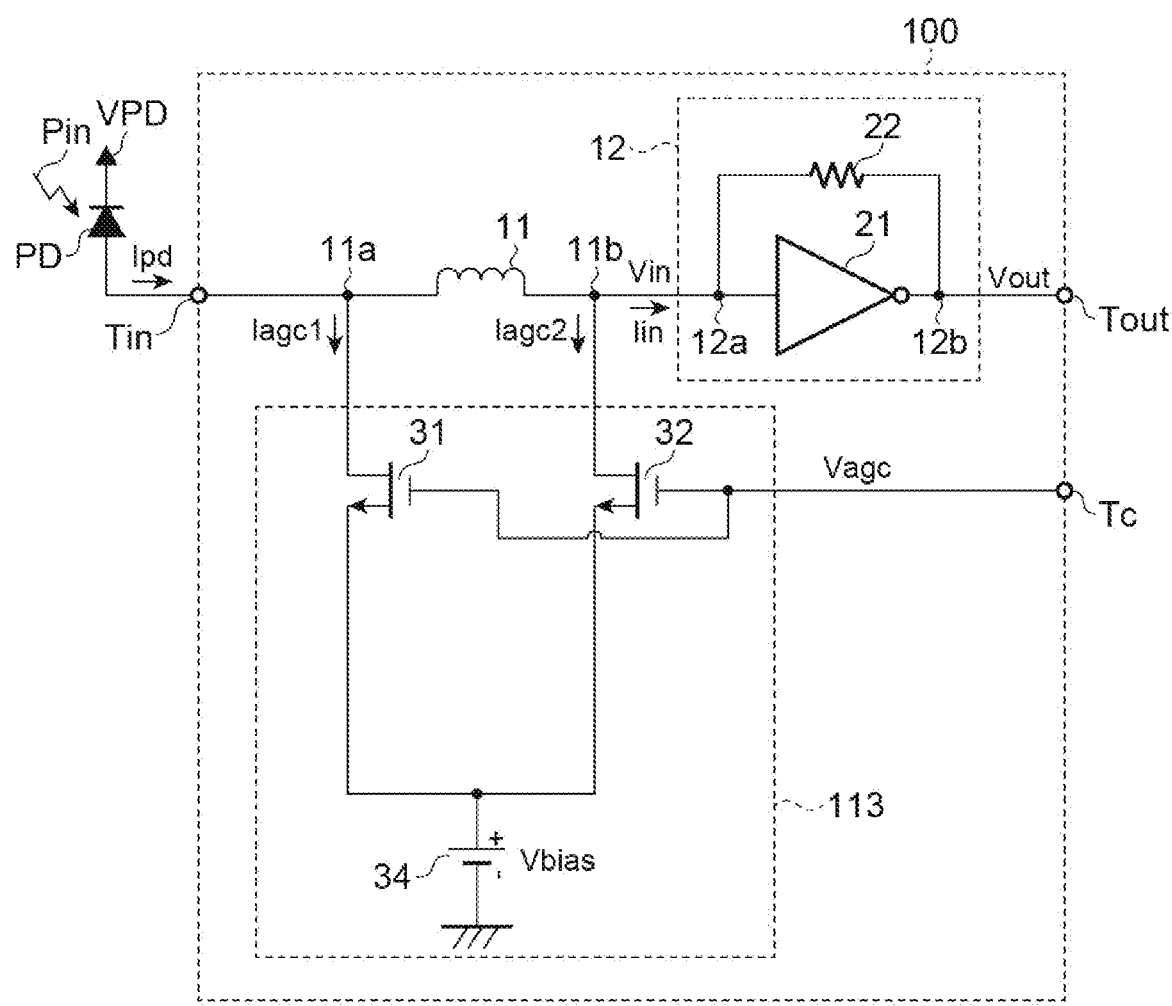
FIG. 2 is a diagram illustrating a configuration of an optical receiver including a receiver circuit according to a comparative example.

Next, with reference to FIG. 2 to FIG. 7, the frequency characteristics of the receiver circuit 10 will be described in comparison with a receiver circuit 100 of a comparative example. First, a configuration of the receiver circuit 100 will be described with reference to FIG. 2. FIG. 2 is a diagram schematically showing the configuration of an optical receiver including the receiver circuit according to the comparative example. As shown in FIG. 2, the receiver circuit 100 of the comparative example is mainly different from the receiver circuit 10 in that a bypass circuit 113 is included instead of the bypass circuit 13. The bypass circuit 113 is mainly different from the bypass circuit 13 in that the impedance adjustment circuit 33 is not included.

Figure 3:
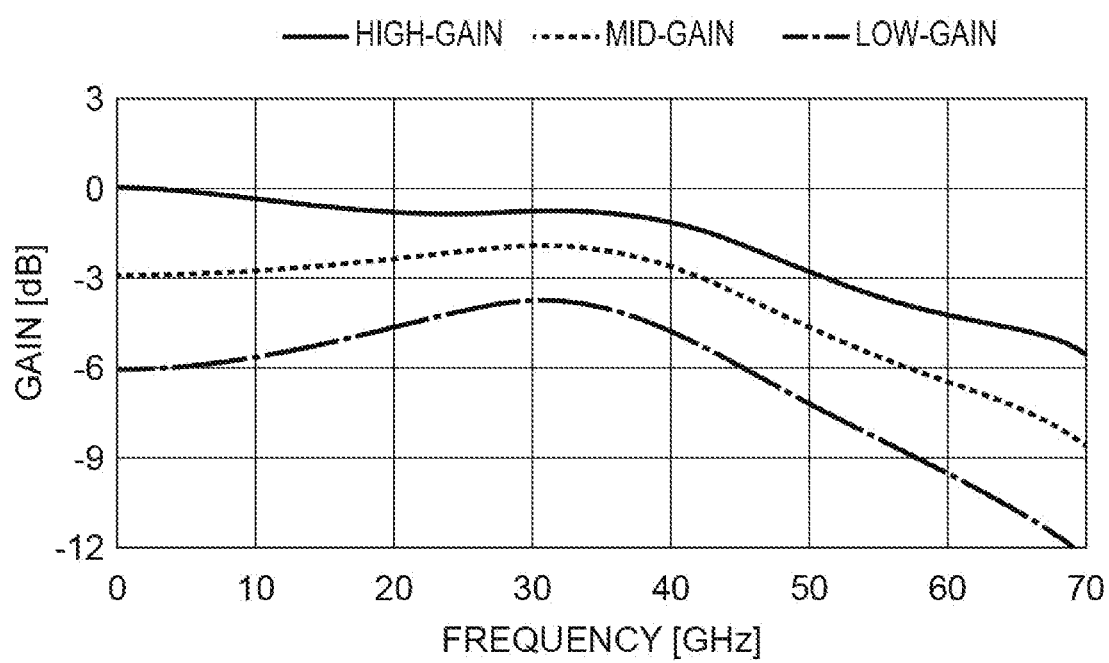
FIG. 3 is a diagram illustrating frequency characteristics of gain in the optical receiver shown in FIG. 2.
Figure 4:
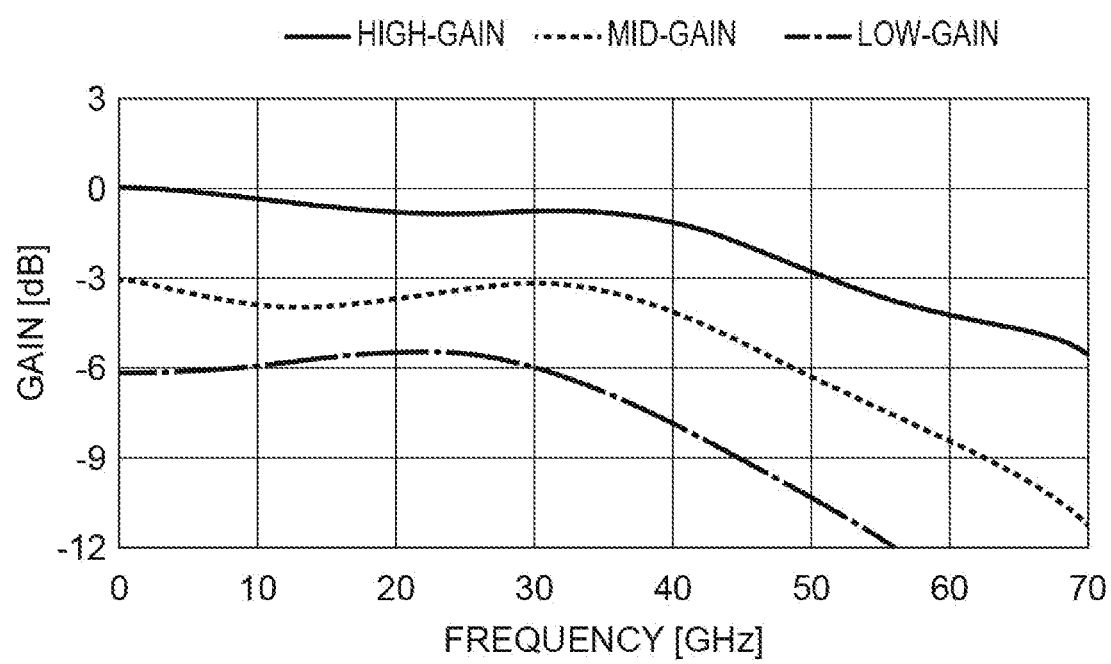
FIG. 4 is a diagram illustrating frequency characteristics of gain in the optical receiver shown in FIG. 1.
Figure 5:
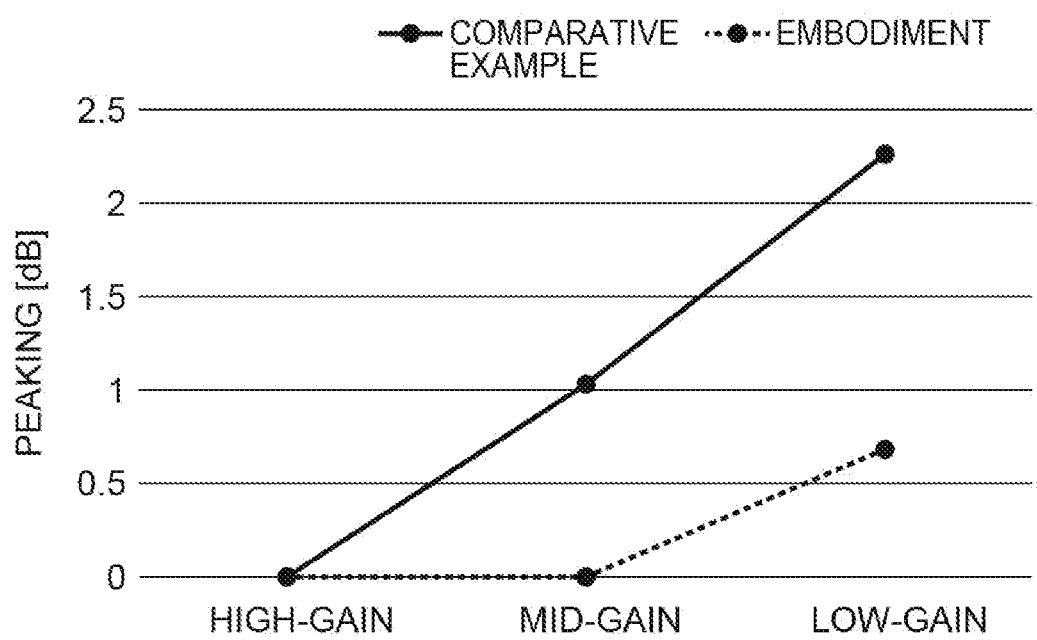
FIG. 5 is a diagram illustrating a peaking in the frequency characteristics shown in FIG. 3 and FIG. 4.

Referring to FIG. 3 to FIG. 5, the frequency characteristics of the receiver circuit 10 and the frequency characteristics of the receiver circuit 100 will be compared. FIG. 3 is a graph showing the frequency characteristics of gain in the optical receiver shown in FIG. 2. FIG. 4 is a graph showing the frequency characteristics of gain in the optical receiver shown in FIG. 1. FIG. 5 shows a peaking in each of the frequency characteristics shown in FIG. 3 and FIG. 4. The horizontal axis in each of FIG. 3 and FIG. 4 represents the frequency (unit: GHz) of the photocurrent Ipd. The vertical axis in each of FIG. 3 and FIG. 4 represents gain (unit: dB). The gain shown in these figures is a normalized conversion efficiency from the photocurrent Ipd to the voltage signal Vout. For example, the curve labeled "high-gain" shows a relative change in dB with respect to a value of the gain at the frequency of 1 GHz. The high-gain is, for example, the maximum gain in each of the receiver circuit 10 and the receiver circuit 100. For example, when the photocurrent Ipd is relatively small, the gain of the receiver circuit is set to the maximum gain. For example, when the gains of the receiver circuits are set to maximum gains, the bypass currents Iagc1 and Iagc2 are adjusted to be zero. The curves labeled "mid-gain" and "low-gain" also show relative changes in dB with respect to the gains at the frequency of 1 GHz of the curves labeled "high-gain". As indicated by the values of the respective gains at the frequency of 1 GHz, the "mid-gain" corresponds to the case when the gain at the frequency of 1 GHz are lowered by 3 dB with respect to the "high-gain", and the "low-gain" corresponds to the case when the gain at the frequency of 1 GHz are lowered by 6 dB with respect to the "high-gain". In the "low-gain" state, the bypass currents Iagc1 and Iagc2 are subtracted from the photocurrent Ipd. The vertical axis of FIG. 5 represents the peaking (unit: dB). The peaking represents a height of the peak and is a difference between the gain at the frequency of 1 GHz and the maximum gain in a range of frequencies to be calculated. In particular, the peaking is obtained by subtracting the gain at the frequency of 1 GHz from the maximum gain in the range of frequencies to be calculated. A value of the peaking is greater than 0 dB when the gains at frequencies greater than 1 GHz are greater than the gain at frequency of 1 GHz. The peaking becomes 0 dB when the gains at frequencies greater than 1 GHz are less than the gain at frequency of 1 GHz.

The frequency characteristics shown in FIG. 3 and FIG. 4 were calculated using an equivalent circuit of the optical receiver 1. In the equivalent circuit, the transistors 31 and 32 were represented as resistors. The resistances $R_{AGC1}$ and $R_{AGC2}$ were set to values corresponding to the respective gains, and the inductance L1 was set to 300 pH. The voltage value of the bias voltage Vbias was set to the same value as the average value of the input voltage Vin of the input node 12a of the transimpedance amplifier 12. The receiver circuit 10 and the receiver circuit 100 are different from each other in the setting values of the resistance R1 and the capacitance C1. The receiver circuit 100 was represented by setting the resistance R1 to 0Ω and the capacitance C1 to 0 F. The receiver circuit 10 was represented by setting the resistance R1 to 3.3 kΩ and the capacitance C1 to 80 fF. The resistances $R_{AGC1}$ and $R_{AGC2}$ were adjusted so that the current amounts of the bypass currents Iagc1 and Iagc2 at a low frequency in the simulation of the receiver circuit 10 were substantially the same as the current amounts of the bypass currents Iagc1 and Iagc2 at the low frequency in the simulation of the receiver circuit 100.

When both of the transistors 31 and 32 are in the OFF state, since the bypass currents Iagc1 and Iagc2 are not subtracted from the photocurrent Ipd, the gain of the receiver circuit 10 becomes the high-gain. Therefore, the frequency characteristics in the high-gain state were calculated by setting both the transistors 31 and 32 to the OFF state. When both of the transistors 31 and 32 are in the ON state, since the bypass currents Iagc1 and Iagc2 are subtracted from the photocurrent Ipd, the gain of the receiver circuit 10 becomes the mid-gain or the low-gain. Therefore, the frequency characteristics in each of the mid-gain state and the low-gain state were calculated by setting both of the transistors 31 and 32 to the ON state. More specifically, the frequency characteristics in the mid-gain state were calculated by setting the resistance $R_{AGC1}$ and resistance $R_{AGC2}$ to a value (200Ω) between a value in the high-gain state and a value in the low-gain state. The frequency characteristics in the low-gain state were calculated by setting the resistance $R_{AGC1}$ and the resistance $R_{AGC2}$ to a value (80Ω) in the low-gain state. Note that in the equivalent circuit, the high-gain state was calculated by setting both of the resistance $R_{AGC1}$ and the resistance $R_{AGC2}$ to 1 TΩ. By setting the resistance $R_{AGC1}$ and the resistance $R_{AGC2}$ to 1 TΩ, the bypass currents Iagc1 and Iagc2 can be regarded as zero.

As shown in FIG. 3 and FIG. 4, the frequency characteristic of the receiver circuit 10 in the high-gain state and the frequency characteristic of the receiver circuit 100 in the high-gain state are substantially the same. The frequency characteristics (see FIG. 3) of the receiver circuit 100 in the mid-gain state and the low-gain state have peaks at frequencies near the 30 GHz, which may deteriorate the transmission characteristics. On the other hand, no peak occurs in the frequency characteristic (see FIG. 4) in the mid-gain state of the receiver circuit 10, and a slight peak occurs at frequencies near the 25 GHz in the frequency characteristic in the low-gain state.

As shown in FIG. 5, in the receiver circuit 100, as the gain decreases, the peaking increases. The peaking in the low-gain state is about 2.3 dB. On the other hand, in the receiver circuit 10, no peak occurs in the high-gain state and the mid-gain state. The peaking in the low-gain state of the receiver circuit 10 is about 0.7 dB and is suppressed to be lower than the peaking in the low-gain state of the receiver circuit 100.

Figure 6:
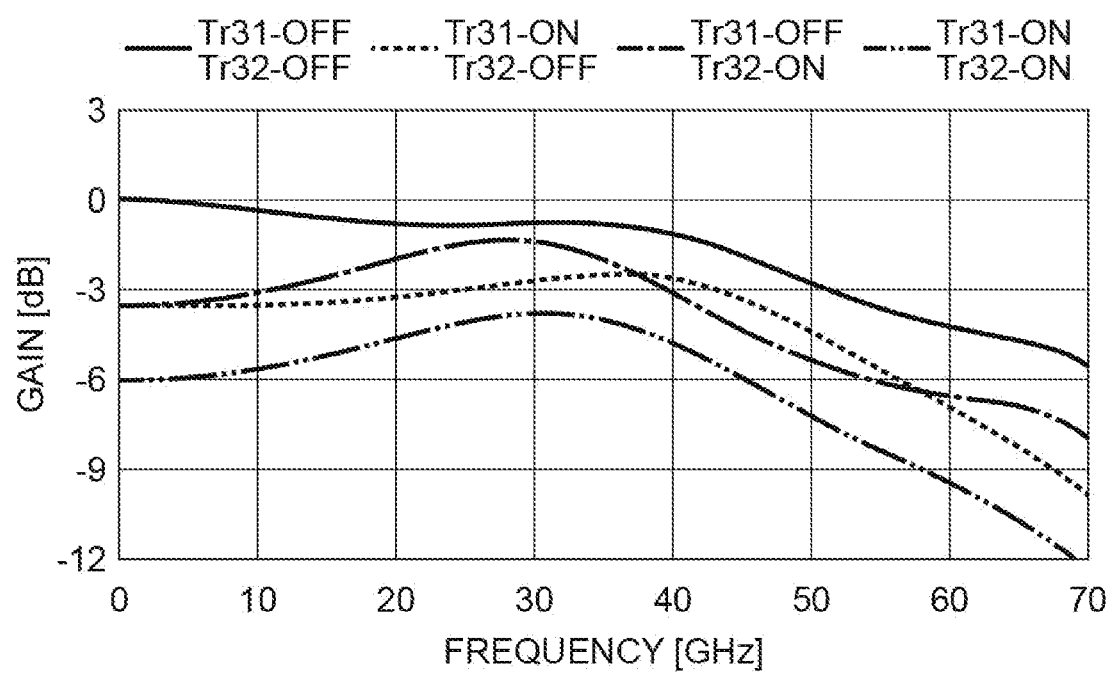
FIG. 6 is a diagram illustrating an operation principle of the receiver circuit shown in FIG. 2.
Figure 7:
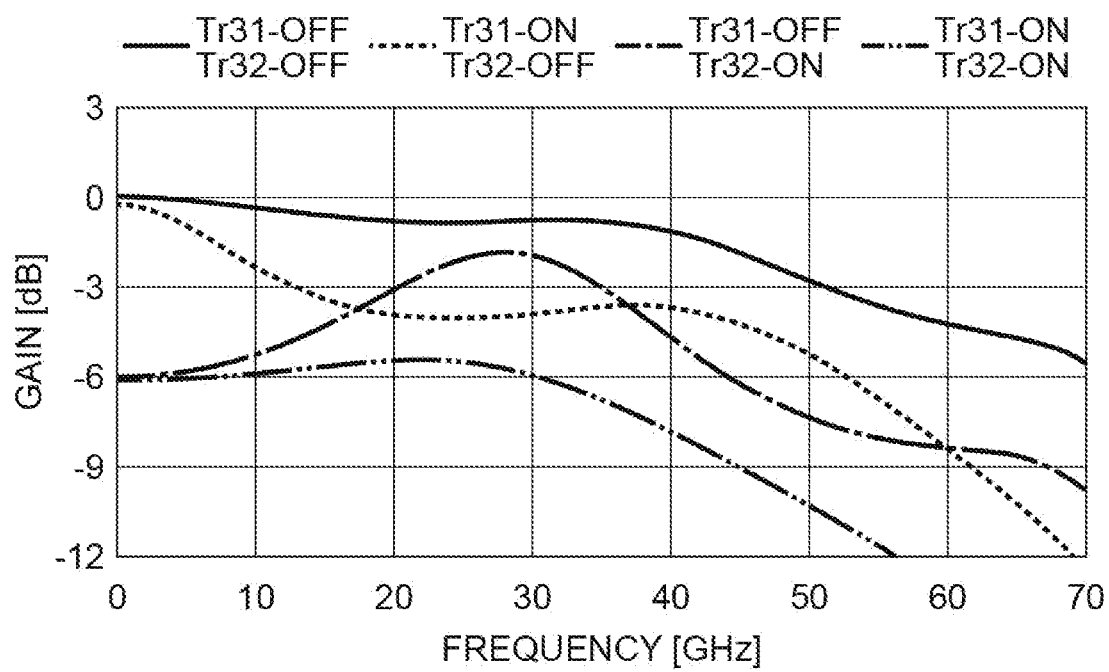
FIG. 7 is a diagram illustrating an operation principle of the receiver circuit shown in FIG. 1.

Referring now to FIG. 6 and FIG. 7, the operation principle of the receiver circuits 10 and 100 will be described. FIG. 6 is a diagram for explaining the operation principle of the receiver circuit shown in FIG. 2. FIG. 7 is a diagram for explaining the operation principle of the receiver circuit shown in FIG. 1. The horizontal axis in each of FIG. 6 and FIG. 7 represents the frequency (unit: GHz) of the photocurrent Ipd. The vertical axis in each of FIG. 6 and FIG. 7 represents gain (unit: dB). The gain shown in these figures is the normalized conversion efficiency from the photocurrent Ipd to the voltage signal Vout. For example, a curve labeled "Tr31-OFF, Tr32-OFF" corresponding to the case of the high-gain indicates a relative change in dB with respect to the value of the gain at the frequency of 1 GHz as a reference. In other word, the unit of the vertical axis displays the normalized values with respect to the maximum value of the gain at the frequency of 1 GHz. The gain used as the reference is, for example, the maximum gain in each of the receiver circuit 10 and the receiver circuit 100. The curve of "Tr31-OFF, Tr32-OFF" corresponds to the case in which both the transistors 31 and 32 are in the OFF state and the bypass currents Iagc1 and Iagc2 are not subtracted from the photocurrent Ipd. The other curves also show relative changes in dB with respect to the maximum value of the gain at frequency of 1 GHz corresponding to the high-gain of the curve labeled "Tr31-OFF, Tr32-OFF". As shown by the values of the respective gains at frequency of 1 GHz, the curves labeled "Tr31-ON, Tr32-OFF" and "Tr31-OFF, Tr32-ON" correspond to the mid-gain case that is lowered by 3 dB with respect to the high-gain case of the curves labeled "Tr31-OFF, Tr32-OFF". The curve labeled "Tr31-ON, Tr32-ON" corresponds to the low-gain case that is lowered by 6 dB with respect to the high-gain case of the curve labeled "Tr31-OFF, Tr32-OFF".

The frequency characteristics shown in FIG. 6 and FIG. 7 were calculated using the equivalent circuit of the optical receiver 1. To simulate the receiver circuit 100, the setting values for each circuit element of the equivalent circuit were set to the same values as those used to calculate the frequency characteristics of FIG. 3. To simulate the receiver circuit 10, the setting values for each circuit element of the equivalent circuit were set to the same values as those used to calculate the frequency characteristics of FIG. 4.

As shown in FIG. 6, when both of the transistors 31 and 32 are in the OFF state (high-gain state), the frequency characteristic of the receiver circuit 100 does not have a peak. When the transistor 31 is in the ON state and the transistor 32 is in the OFF state, the frequency characteristic of the receiver circuit 100 has a peak at the frequency around 35 GHz. This peak is generated due to resonance caused by capacitance of the photodetector PD, pad capacitances of the photodetector PD and the receiver circuit 100, capacitance of an electro-static discharge (ESD) element or the like (not illustrated), inductance of a bonding wire connecting the photodetector PD and the receiver circuit 100, and inductance of a noise suppression inductor of the transimpedance amplifier 12. That is, the equivalent circuit of the optical receiver 1 includes the capacitance of the photodetector PD, the pad capacitances of the photodetector PD and the receiver circuit 100, the capacitance of an ESD (Electro-Static Discharge) element or the like (not illustrated), the inductance of a bonding wire connecting the photodetector PD and the receiver circuit 100, and the inductance of a noise suppression inductor of the transimpedance amplifier 12. For the same reason, when the transistor 31 is in the OFF state and the transistor 32 is in the ON state, the frequency characteristic of the receiver circuit 100 has a peak at the frequency near the 28 GHz. When both of the transistors 31 and 32 are in the ON state (low-gain state), the frequency characteristic of the receiver circuit 100 is a characteristic obtained by adding the frequency characteristic when the transistor 31 is in the ON state and the transistor 32 is in the OFF state and the frequency characteristic when the transistor 31 is in the OFF state and the transistor 32 is in the ON state, and has a peak at the frequency near the 30 GHz.

As shown in FIG. 7, when both of the transistors 31 and 32 are in the OFF state (high-gain state), the frequency characteristic of the receiver circuit 10 is substantially the same as the frequency characteristic of the receiver circuit 100 and does not have a peak. The impedance adjustment circuit 33 has a time constant $\tau(=R1 \times C1)$ determined by the resistance R1 and the capacitance C1. The impedance of the impedance adjustment circuit 33 is determined by the resistance R1 at frequencies lower than a cut-off frequency fc determined by the time constant $\tau$, and decreases by the capacitance C1 at frequencies higher than the cut-off frequency fc. Since the resistance R1 is set to a value sufficiently larger than the input impedance of the transimpedance amplifier 12, the impedance of the impedance adjustment circuit 33 becomes large at frequencies lower than the cut-off frequency fc, and the bypass current Iagc1 is hardly subtracted from the photocurrent Ipd. On the other hand, at frequencies higher than the cut-off frequency fc, since the impedance of the impedance adjustment circuit 33 decreases, the amount of the bypass current Iagc1 subtracted from the photocurrent Ipd increases. Therefore, when the transistor 31 is in the ON state and the transistor 32 is in the OFF state, the frequency characteristic of the receiver circuit 10 shows a characteristic in which the gain does not decrease at low frequencies and the amount of decrease in the gain increases at high frequencies.

Similarly to the receiver circuit 100, when the transistor 31 is in the OFF state and the transistor 32 is in the ON state, a certain amount of the bypass current Iagc2 is subtracted from the photocurrent Ipd at low frequencies and high frequencies, but the amount of the bypass current Iagc2 decreases at intermediate frequencies. That is, when the transistor 31 is in the OFF state and the transistor 32 is in the ON state, the frequency characteristic of the receiver circuit 10 has a peak at the frequency near the 28 GHz. When both of the transistors 31 and 32 are in the ON states, the frequency characteristic of the receiver circuit 10 becomes a characteristic obtained by adding the frequency characteristic in the case where the transistor 31 is in the ON state and the transistor 32 is in the OFF state and the frequency characteristic in the case where the transistor 31 is in the OFF state and the transistor 32 is in the ON state, and the peaking in the intermediate frequency region is cancelled. As a result, the characteristic with reduced peaking can be obtained.

Figure 8:
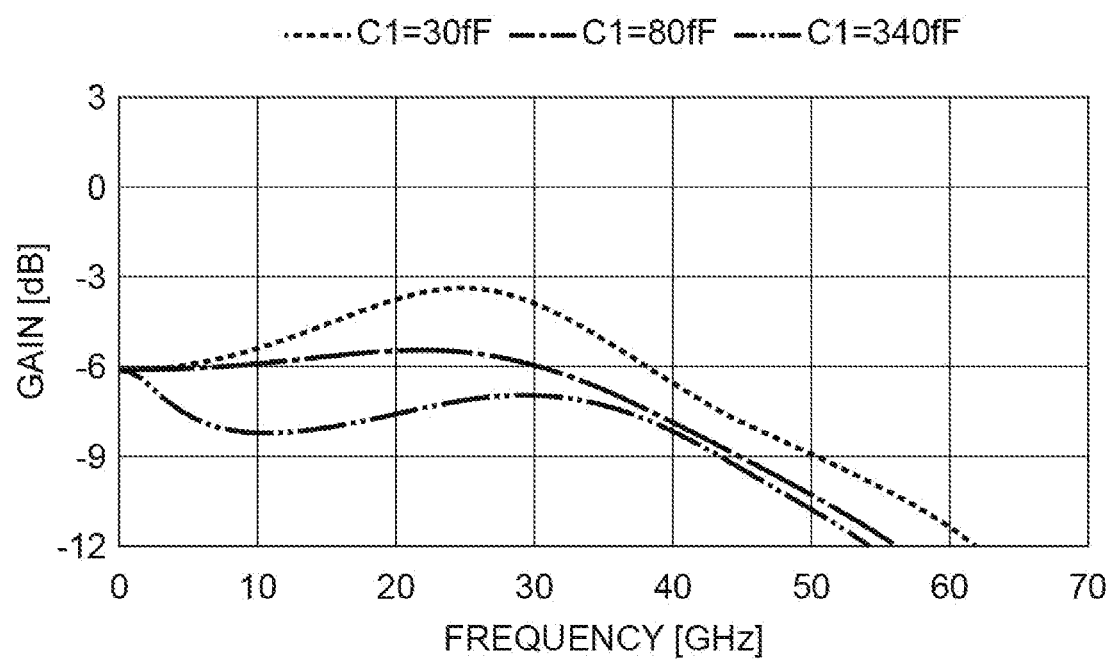
FIG. 8 is a diagram illustrating a method of determining a resistance and a capacitance of an impedance adjustment circuit.

Next, a method of determining the resistance R1 of the resistor 35 and the capacitance C1 of the capacitor 36 will be described with reference to FIG. 8. FIG. 8 is a diagram for explaining a method of determining a resistance and a capacitance of an impedance adjustment circuit. The horizontal axis of FIG. 8 represents the frequency (unit: GHz) of the photocurrent Ipd. The vertical axis of FIG. 8 represents the gain (unit: dB). The gain shown in FIG. 8 is the normalized conversion efficiency from the photocurrent Ipd to the voltage signal Vout. In the calculation of the frequency characteristics shown in FIG. 8, the same values as those used in the calculation of the frequency characteristics shown in FIG. 7 were used as the setting values of the respective circuit elements except for the capacitance C1 of the equivalent circuit.

First, the resistance R1 is determined. In the low-gain state in which the transistor 31 is in the ON state, the bypass current Iagc1 should be hardly subtracted from the photocurrent Ipd at low frequencies as described above. Therefore, the impedance of the transistor 31 when viewed from the drain needs to be sufficiently larger than the input impedance of the transimpedance amplifier 12. Since the input impedance of the transimpedance amplifier 12 is generally about several tens $\Omega$ to one hundred and several tens $\Omega$, the resistance R1 is determined to be several k$\Omega$, for example. Here, it is assumed that the input impedance of the transimpedance amplifier 12 is 80$\Omega$, and the resistance R1 is determined to be 3.3 k$\Omega$.

Subsequently, the capacitance C1 is determined. The bypass current Iagc1 needs to be subtracted to some extent at a frequency of about half of a peak frequency available when the transistor 31 is in the OFF state (in other words, when the impedance adjustment circuit 33 is temporarily opened) and the transistor 32 is in the ON state. The peak frequency is a frequency at which the gain is maximized in the frequency characteristic. In other words, the peak frequency is a frequency at which a peak occurs in the frequency characteristic. Therefore, the capacitance C1 is determined so that the impedance of the impedance adjustment circuit 33 is smaller than the resistance $R_{AGC1}$ of the transistor 31 at half the peak frequency. Assuming that the peak frequency is several tens GHz and the resistance $R_{AGC1}$ is several tens Ω, the capacitance C1 is determined so that the cut-off frequency fc of the impedance adjustment circuit 33 becomes several hundreds MHz. Since the cut-off frequency fc is expressed by Equation (1), the capacitance C1 is determined from Equation (1). The capacitance C1 is determined to be, for example, several tens fF to several hundreds fF. The capacitor 36 having the capacitance C1 can be formed on an integrated circuit (semiconductor chip). The impedance of the impedance adjustment circuit 33 decreases as the frequency increases due to an action of the capacitor 36, as described later. Therefore, at high frequencies, the subtraction amount of the bypass current Iagc1 can be determined mainly by an on-resistance (resistance $R_{AGC1}$) of the transistor 31.

[Equation 1]

$$fc = \frac{1}{2 \times \pi \times R1 \times C1} \tag{1}$$

When the receiver circuit 10 has the frequency characteristics shown in FIG. 7, the peak frequency when the transistor 31 is in the OFF state and the transistor 32 is in the ON state is about 28 GHz. Therefore, the capacitance C1 is determined so that the impedance of the impedance adjustment circuit 33 becomes smaller than the resistance $R_{AGC1}$ (=80Ω) of the transistor 31 so as to subtract the bypass current Iagc1 at the frequency of 14 GHz which is half the peak frequency. In order for the transistor 31 to subtract the bypass current Iagc1 from the photocurrent Ipd, the resistance $R_{AGC1}$ of the transistor 31 needs to be smaller than the input impedance of the transimpedance amplifier 12. Further, in order to adjust the bypass current Iagc1 in accordance with the resistance $R_{AGC1}$, the impedance of the impedance adjustment circuit 33 may be smaller than the resistance $R_{AGC1}$ of the transistor 31.

For example, the cut-off frequency fc is set to about 140 MHz so that the impedance of the impedance adjustment circuit 33 becomes about one hundredth of the resistance R1 (=3.3 kΩ) at the frequency (14 GHz) half of the peak frequency (28 GHz). Thus, the impedance of the impedance adjustment circuit 33 can be made smaller than the resistance $R_{AGC1}$ (=80Ω) at the half of the peak frequency (14 GHz). More specifically, the impedance of the impedance adjustment circuit 33 is reduced to, for example, one tenth at high frequencies by the action of the capacitor 36 when the frequencies are increased ten times. Therefore, when the impedance of the impedance adjustment circuit 33 at 14 GHz is set to one hundredth of that at low frequencies, the cut-off frequency fc may be set to one hundredth of half of the peak frequency. For example, at low frequencies (e.g., one hundredth of half the peak frequency), the impedance of the impedance adjustment circuit 33 is mainly determined by the resistance R1, and at high frequencies (e.g., half the peak frequency), the impedance of the impedance adjustment circuit 33 can be one hundredth or less of the resistance R1. For example, the impedance of the impedance adjustment circuit 33 is 3.3 kΩ at frequencies lower than the frequency of 140 MHz, and is 33Ω at the frequency of 14 GHz. From Equation (1), the capacitance C1 at which fc=140 MHz is calculated as 340 fF.

Further, the frequency characteristics of the receiver circuit 10 are calculated by changing a value of the capacitance C1 from the value of the capacitance C1 determined by calculation. A characteristic is selected from a plurality of frequency characteristics calculated by changing the capacitance C1 stepwise, and the capacitance C1 corresponding to the characteristic is adopted. For example, as shown in FIG. 8, when the capacitance C1 is 340 fF, a peak does not occur, but the flatness of the frequency characteristic decreases. On the other hand, when the capacitance C1 is 30 fF, since the cut-off frequency fc becomes high, the peak cannot be sufficiently suppressed. When the capacitance C1 is 80 fF, it is possible to improve the flatness of the frequency characteristic while suppressing the peak. Therefore, in this calculation, 80 fF is adopted as the capacitance C1. As described above, in the gain adjustment by the transistor 31 and the transistor 32, a peak may occur in the frequency characteristic according to the gain. On the other hand, by providing the impedance adjustment circuit 33, it is possible to compensate the frequency characteristic so as to suppress the peak.

As described above, in the receiver circuit 10, the transistor 31 is electrically coupled between the terminal 11a of the inductor 11 and the bias circuit 34, and the transistor 32 is electrically coupled between the terminal 11b of the inductor 11 and the bias circuit 34. Further, the impedance adjustment circuit 33 in which the resistor 35 and the capacitor 36 are connected in parallel is connected in series with the transistor 31. When the transistor 31 is in the OFF state and the transistor 32 is in the ON state, the frequency characteristic of the gain has a peak at a predetermined frequency. Since the impedance of the impedance adjustment circuit 33 is determined by the resistance R1 of the resistor 35 in a low-frequency region lower than the cut-off frequency fc and is decreased by the capacitance C1 of the capacitor 36 in a high-frequency region higher than the cut-off frequency fc, the gain-frequency characteristic when the transistor 31 is in the ON state and the transistor 32 is in the OFF state shows a characteristic in which the gain does not decrease in the low-frequency region and the amount of decrease in the gain increases in the high-frequency region. The frequency characteristic in the low-gain state in which both the transistor 31 and the transistor 32 are in the ON state shows a characteristic obtained by adding the frequency characteristic of the gain in the case where the transistor 31 is in the ON state and the transistor 32 is in the OFF state and the frequency characteristic of the gain in the case where the transistor 31 is in the OFF state and the transistor 32 is in the ON state. Therefore, in the low-gain state, the decrease in the gain in the low frequency region is suppressed, and the decrease in the gain in the high frequency region is maintained. As a result, it is possible to suppress the peaking in the low-gain state, and the frequency characteristic of the gain can be stabilized for a wide dynamic range of the input optical signal Pin.

In the receiver circuit 100, the peaking of the frequency characteristic when the transistor 31 is in the OFF state and the transistor 32 is in the ON state is larger than the peaking of the frequency characteristic when the transistor 31 is in the ON state and the transistor 32 is in the OFF state. When an attempt is made to suppress the peaking by connecting the impedance adjustment circuit 33 in series to the transistor 32 in the receiver circuit 100 having such a frequency characteristic, the compensation of the frequency characteristic by the impedance adjustment circuit 33 becomes excessive, and there is a concern that the flatness of the frequency characteristic decreases. On the other hand, by connecting the impedance adjustment circuit 33 in series to the transistor 31 to suppress the peaking, it is possible to suppress excessive compensation of the frequency characteristic by the impedance adjustment circuit 33, and thus it is possible to improve the flatness of the frequency characteristic.

The high-speed photocurrent Ipd is transmitted to a signal line connecting the input terminal Tin to the terminal 11a of the inductor 11. In the configuration in which the transistor 31 is connected between the impedance adjustment circuit 33 and the bias circuit 34, since the resistor 35 and the capacitor 36 are connected to the signal line, the parasitic capacitance of the signal line may increase as compared with the configuration in which the transistor 31 is connected to the signal line. On the other hand, the impedance adjustment circuit 33 is electrically coupled between the transistor 31 and the bias circuit 34. Therefore, the parasitic capacitance of the signal line can be suppressed, and the deterioration of the frequency characteristic can be suppressed.

The resistance $R_{AGC1}$ of the transistor 31 and the resistance $R_{AGC2}$ of the transistor 32 change in accordance with the control voltage Vagc. That is, the resistance $R_{AGC1}$ and the resistance $R_{AGC2}$ are controlled by the single control voltage Vagc. Therefore, it is possible to simplify the control of the resistance $R_{AGC1}$ and the resistance $R_{AGC2}$. Since the resistance $R_{AGC1}$ and the resistance $R_{AGC2}$ are controlled in conjunction with each other, a ratio between the resistance $R_{AGC1}$ and the resistance $R_{AGC2}$ can be fixed by a ratio between a size of the transistor 31 and a size of the transistor 32.

The resistance R1 of the resistor 35 is set to a value larger than the value of the input impedance of the input node 12a. Therefore, since the impedance of the impedance adjustment circuit 33 increases at low frequencies, the current amount of the bypass current Iagc1 subtracted from the photocurrent Ipd decreases. Therefore, in the low-gain state in which the transistors 31 and 32 are in the ON states, a decrease in the gain at low frequencies is further suppressed. As a result, it is possible to further suppress the peaking in the low gain state.

In the low-frequency region in which frequencies are lower than the cut-off frequency fc of the impedance adjustment circuit 33, the impedance of the impedance adjustment circuit 33 is determined by the resistance R1 of the resistor 35, so that reduction in gain is suppressed. On the other hand, in the high-frequency region in which frequencies are higher than the cut-off frequency fc, the impedance of the impedance adjustment circuit 33 is reduced by the capacitance C1 of the capacitor 36, so that reduction in gain occurs. Therefore, by setting the cut-off frequency fc to be lower than half of the peak frequency when the transistor 31 is in the OFF state and the transistor 32 is in the ON state, it is possible to suppress a decrease in the gain at the low frequencies and to reduce the peaking in the low-gain state.

The voltage value of the bias voltage Vbias is substantially equal to the average value of the input voltage Vin at the input node 12a. In this case, the direct current component of the photocurrent Ipd hardly flow into the transistor 31 and the transistor 32, and a part of alternating current components of the photocurrent Ipd is subtracted as bypass currents Iagc1 and Iagc2. Therefore, it is possible to realize gain control without reducing the direct current component of the photocurrent Ipd. Further, when the photocurrent Ipd is relatively small, the subtraction of the alternating current component of the photocurrent Ipd is suppressed, so that the attenuation of the alternating current component can be avoided. When the photocurrent Ipd is relatively large, the alternating current components of the photocurrent Ipd are subtracted from the photocurrent Ipd as the bypass currents Iagc1 and Iagc2, so that the alternating current components of the photocurrent Ipd can be attenuated. As a result, it is possible to ensure the linearity of the voltage signal with respect to the photocurrent in a wide dynamic range of the optical signal Pin.

Note that the receiver circuit according to the present disclosure is not limited to the above-described embodiments.

Figure 9:
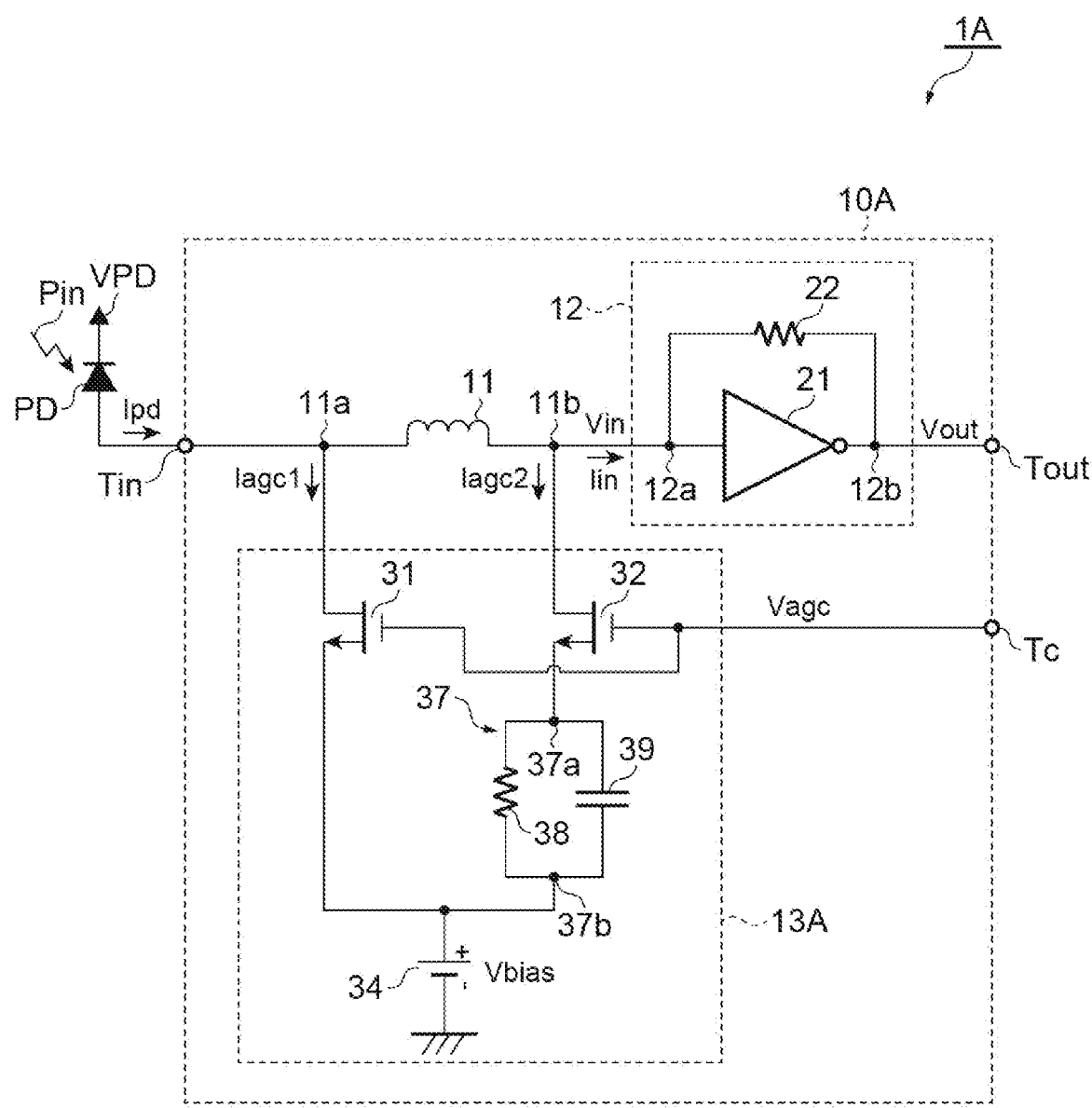
FIG. 9 is a diagram illustrating a configuration of an optical receiver including a receiver circuit according to a modification.
Figure 10:
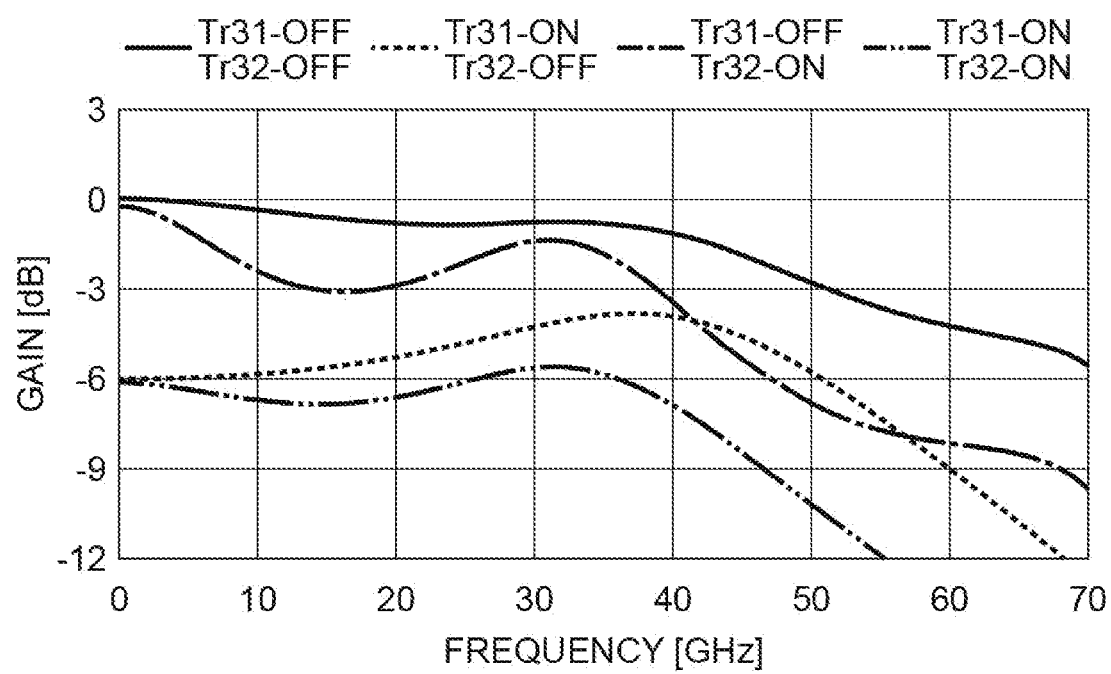
FIG. 10 is a diagram for explaining frequency characteristics of gain in the optical receiver shown in FIG. 9.

With reference to FIG. 9 to FIG. 13, optical receivers including receiver circuits according to modifications will be described. FIG. 9 is a diagram schematically showing a configuration of an optical receiver 1A including a receiver circuit 10A according to a modification. FIG. 10 is a diagram for explaining the frequency characteristics of the gain in the optical receiver shown in FIG. 9. The horizontal axis in FIG. 10 represents the frequency (unit: GHz) of the photocurrent Ipd. The vertical axis in FIG. 10 represents gain (unit: dB). The gain shown in FIG. 10 is the normalized conversion efficiency from the photocurrent Ipd to the voltage signal Vout.

For example, a curve labeled "Tr31-OFF, Tr32-OFF" corresponding to the case of high-gain shows a relative change in dB with respect to the value of the gain at the frequency of 1 GHz as a reference. The gain used as the reference is, for example, the maximum gain of the receiver circuit 10A. The other curves also show relative changes in dB with respect to the gain at frequency of 1 GHz corresponding to the high-gain of the curve labeled "Tr31-OFF, Tr32-OFF". As indicated by the values of the respective gains at the frequency of 1 GHz, the curve labeled "Tr31-OFF, Tr32-ON" corresponds to the high-gain similarly to the curve labeled "Tr31-OFF, Tr32-OFF". The curve labeled "Tr31-ON, Tr32-OFF" corresponds to low-gain similarly to the curve labeled "Tr31-ON, Tr32-ON".

As shown in FIG. 9, the optical receiver 1A is mainly different from the optical receiver 1 in that the optical receiver 1A includes the receiver circuit 10A instead of the receiver circuit 10. The receiver circuit 10A is mainly different from the receiver circuit 10 in that the receiver circuit 10A includes a bypass circuit 13A instead of the bypass circuit 13. The bypass circuit 13A is mainly different from the bypass circuit 13 in that the bypass circuit 13A includes an impedance adjustment circuit 37 instead of the impedance adjustment circuit 33. The impedance adjustment circuit 37 has a circuit configuration similar to that of the impedance adjustment circuit 33. Specifically, the impedance adjustment circuit 37 includes a resistor 38 and a capacitor 39, and is a circuit in which the resistor 38 and the capacitor 39 are connected in parallel. The impedance adjustment circuit 37 is connected in series to the transistor 32. In the present modification, the impedance adjustment circuit 37 is electrically coupled between the transistor 32 and the bias circuit 34.

The impedance adjustment circuit 37 includes a node 37a and a node 37b. The node 37a is a connection point between one end of the resistor 38 and one end of the capacitor 39. The node 37b is a connection point between the other end of the resistor 38 and the other end of the capacitor 39. The node 37a is electrically coupled to the source of the transistor 32. The node 37b is electrically coupled to the bias circuit 34. A resistance R2 of the resistor 38 is sufficiently larger than the input impedance of the transimpedance amplifier 12 (input node 12a) and is set to, for example, several hundreds Ω to several kΩ. A capacitance C2 of the capacitor 39 is set to, for example, several tens fF to several hundreds fF. The method of determining the resistance R2 and the capacitance C2 is similar to the method of determining the resistance R1 and the capacitance C1.

Also in the receiver circuit 10A, effects similar to those of the receiver circuit 10 are achieved. As shown in FIG. 10, the flatness of the frequency characteristic in the low-gain state of the receiver circuit 10A is lower than in the low-gain state of the receiver circuit 10. As shown in FIG. 10, in the frequency characteristic when the transistor 31 is in the ON state and the transistor 32 is in the OFF state, the peaking is small and the variation amount of the gain is gentle. Therefore, it is considered that the decrease in flatness is caused by the excessive gain compensation by the impedance adjustment circuit 37.

Figure 11:
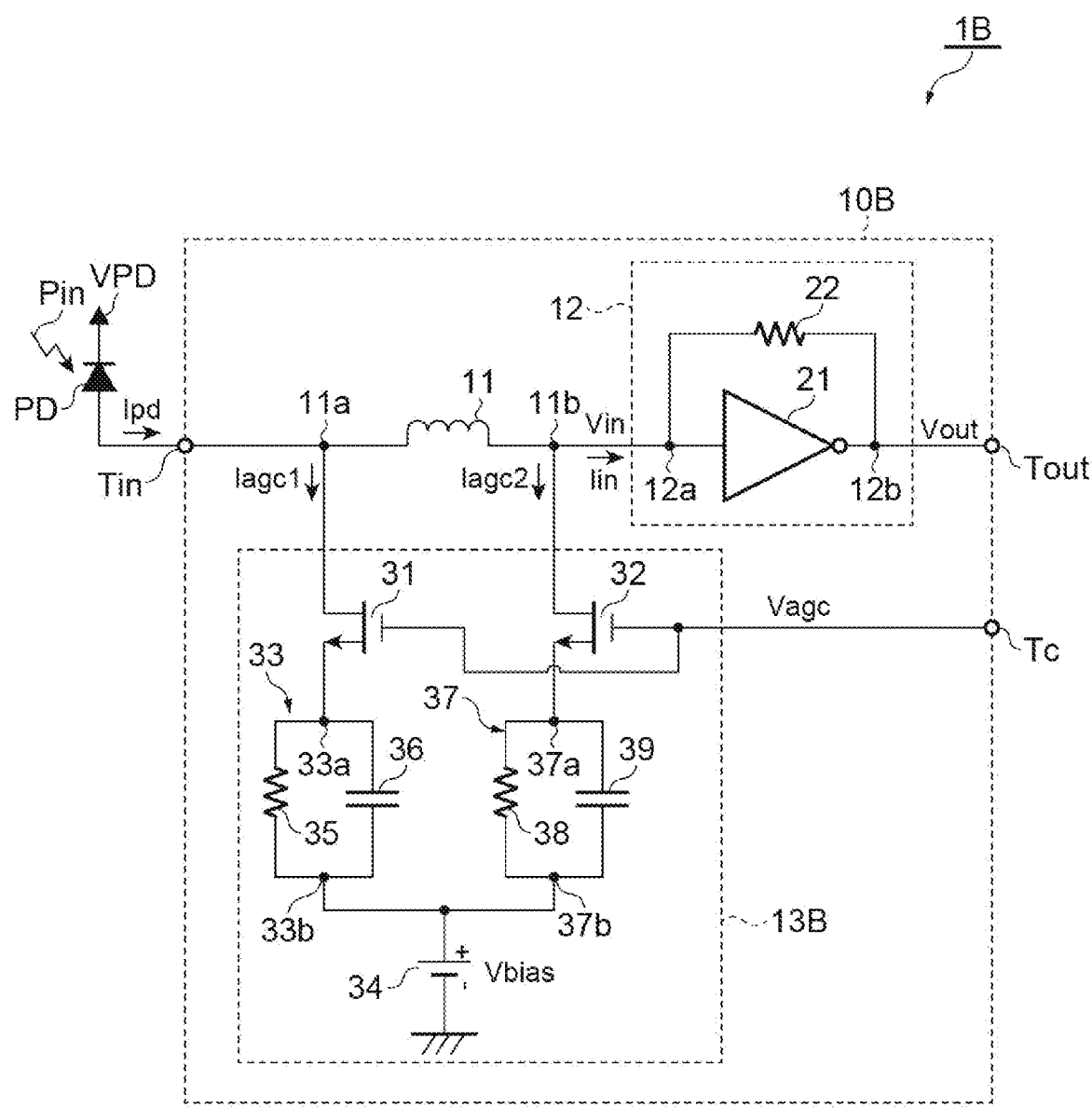
FIG. 11 is a diagram illustrating a configuration of an optical receiver including a receiver circuit according to another modification.

FIG. 11 is a diagram schematically showing a configuration of an optical receiver including a receiver circuit according to another modification. As shown in FIG. 11, an optical receiver 1B is mainly different from the optical receiver 1 in that the optical receiver 1B includes a receiver circuit 10B instead of the receiver circuit 10. The receiver circuit 10B is mainly different from the receiver circuit 10 in that the receiver circuit 10B includes a bypass circuit 13B instead of the bypass circuit 13. The bypass circuit 13B is mainly different from the bypass circuit 13 in that the bypass circuit 13B further includes the impedance adjustment circuit 37 in addition to the impedance adjustment circuit 33. That is, the transistor 31 and the impedance adjustment circuit 33 are connected in series to each other, and the transistor 32 and the impedance adjustment circuit 37 are connected in series to each other. In this modification, the impedance adjustment circuit 33 is electrically coupled between the transistor 31 and the bias circuit 34. The impedance adjustment circuit 37 is electrically coupled between the transistor 32 and the bias circuit 34.

Also in the receiver circuit 10B, effects similar to those of the receiver circuit 10 are achieved.

Figure 12:
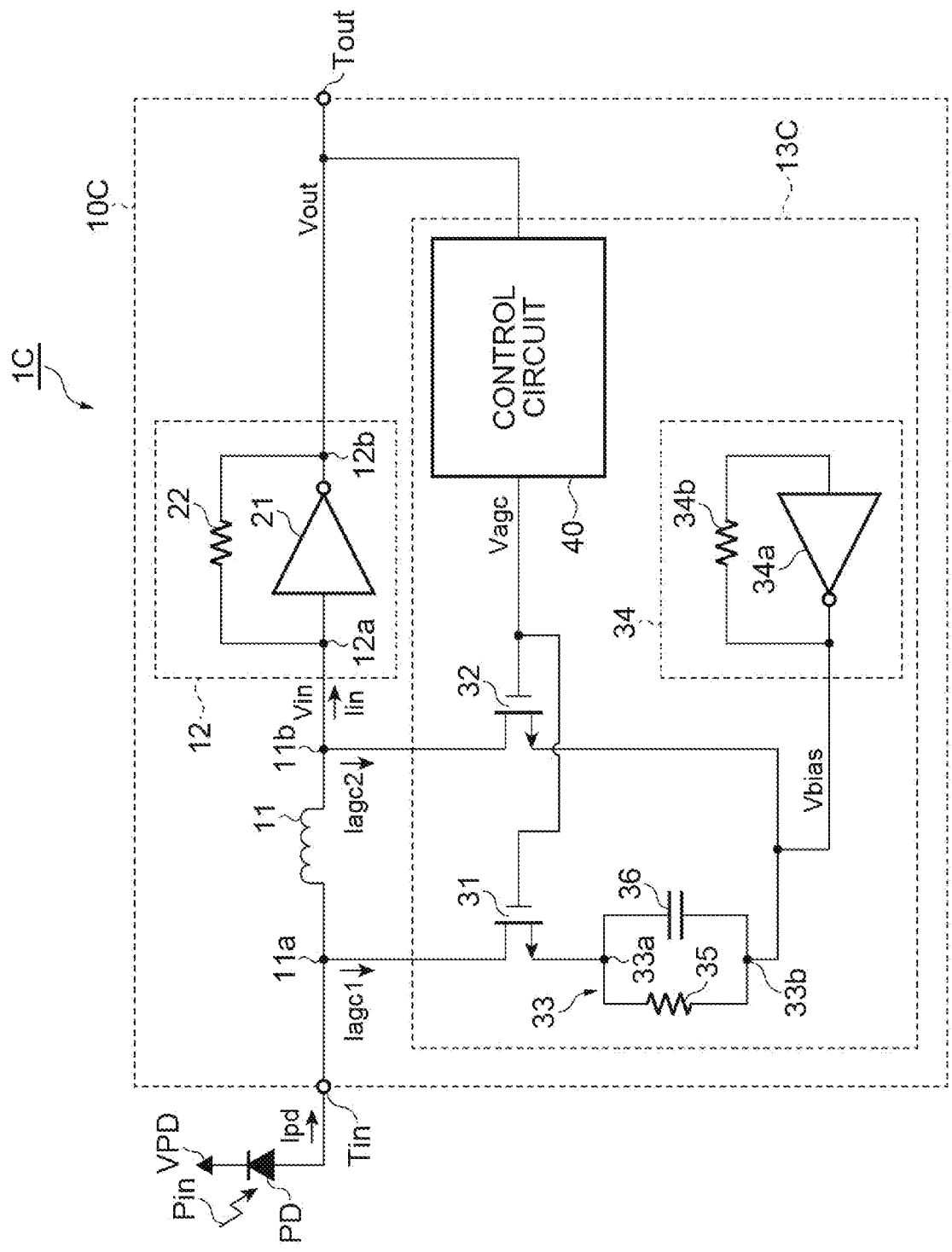
FIG. 12 is a diagram illustrating a configuration of an optical receiver including a receiver circuit according to still another modification.

FIG. 12 is a diagram showing a configuration of an optical receiver including a receiver circuit according to still another modification. As shown in FIG. 12, an optical receiver 1C is mainly different from the optical receiver 1 in that the optical receiver 1C includes a receiver circuit 10C instead of the receiver circuit 10. The receiver circuit 10C is mainly different from the receiver circuit 10 in that the receiver circuit 10C includes a bypass circuit 13C instead of the bypass circuit 13. The bypass circuit 13C is mainly different from the bypass circuit 13 in that the bypass circuit 13C further includes a control circuit 40.

The control circuit 40 generates the control voltage Vagc in accordance with the voltage signal Vout. Specifically, the control circuit 40 detects the amplitude of the voltage signal Vout and generates the control voltage Vagc corresponding to the amplitude. For example, the control circuit 40 increases the voltage value of the control voltage Vagc as the amplitude of the voltage signal Vout increases. The control circuit 40 outputs the control voltage Vagc to the gate of the transistor 31 and the gate of the transistor 32.

Also in the receiver circuit 10C, effects similar to those of the receiver circuit 10 are achieved. The receiver circuit 10C includes the control circuit 40 that generates the control voltage Vagc in accordance with the voltage signal Vout. Therefore, the current amounts of the bypass currents Iagc1 and Iagc2 can be changed according to the amplitude of the voltage signal Vout. For example, by generating the control voltage Vagc so that the resistance $R_{AGC1}$ of the transistor 31 and the resistance $R_{AGC2}$ of the transistor 32 decrease as the amplitude of the voltage signal Vout increases, the current amounts of the bypass currents Iagc1 and Iagc2 can be increased, and the gain can be lowered. As a result, the linearity of the voltage signal Vout with respect to the photocurrent Ipd can be ensured in a wide dynamic range of the optical signal Pin.

In the bypass circuit 13C, the bias circuit 34 has the same configuration as that of the transimpedance amplifier 12. Specifically, the bias circuit 34 is a dummy TIA including a voltage amplifier 34a and a feedback resistor 34b. Input and output terminals of the voltage amplifier 34a are electrically coupled to each other via the feedback resistor 34b. In other words, the feedback resistor 34b is electrically coupled between the input and output of the voltage amplifier 34a. Since the bias circuit 34 has the same circuit configuration as that of the transimpedance amplifier 12, the bias voltage Vbias can be generated so as to compensate (cancel) a change in the input voltage Vin due to changes in a power supply voltage and temperature of the voltage amplifier 21. Therefore, the voltage value of the bias voltage Vbias is substantially equal to the average value (input potential) of the input voltage Vin. The average value corresponds to a DC component of the input voltage Vin. According to this configuration, almost no direct current component of the photocurrent Ipd flow into the transistor 31 and the transistor 32, and a part of alternating current components of the photocurrent Ipd is subtracted as the bypass currents Iagc1 and Iagc2. As a result, gain control can be realized without reducing the direct current component of the photocurrent Ipd with respect to changes in the power supply voltage and temperature of the receiver circuit 10C. Although the bypass circuit 13C includes the control circuit 40 in the above description, the receiver circuit 10C may include the control circuit 40 outside the bypass circuit 13C.

Figure 13:
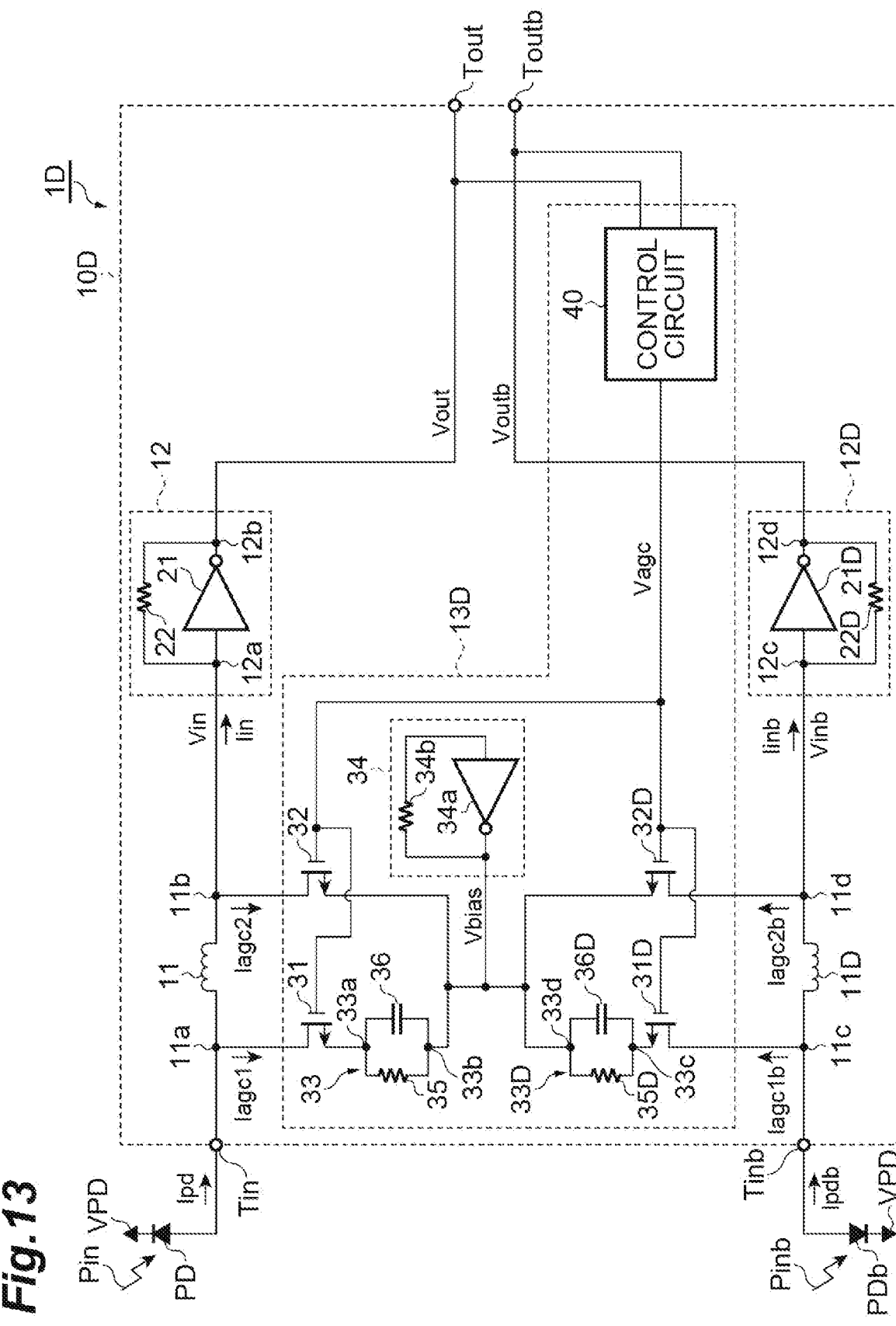
FIG. 13 is a diagram illustrating a configuration of an optical receiver including a receiver circuit according to still another modification.

FIG. 13 is a diagram showing a configuration of an optical receiver including a receiver circuit according to still another modification. As shown in FIG. 13, an optical receiver 1D receives a differential optical signal (a pair of the optical signal Pin and an optical signal Pinb). The optical receiver 1D is mainly different from the optical receiver 1C in that the optical receiver 1D includes a receiver circuit 10D instead of the receiver circuit 10C and further includes a photodetector PDb. The photodetector PDb receives the optical signal Pinb and generates a photocurrent Ipdb in accordance with the optical signal Pinb. Examples of the photodetector PDb includes a photodiode and an avalanche photodiode. One terminal (for example, a cathode) of the photodetector PDb is electrically coupled to a power supply that supplies a predetermined bias voltage VPD, and the other terminal (for example, an anode) of the photodetector PDb outputs the photocurrent Ipdb.

The receiver circuit 10D is a circuit that generates a differential voltage signal (a pair of the voltage signal Vout and a voltage signal Voutb) in accordance with the photocurrents Ipd and Ipdb. For example, the voltage signal Voutb has a phase reverse to a phase of the voltage signal Vout. When the voltage signal Vout increases, the voltage signal Voutb decreases, and when the voltage signal Vout decreases, the voltage signal Voutb increases. When the voltage signal Vout reaches a peak value, the voltage signal Voutb reaches a bottom value, and when the voltage signal Vout reaches a bottom value, the voltage signal Voutb reaches a peak value. The voltage signal Voutb may have an amplitude equal to an amplitude of the voltage signal Vout. The voltage signal Voutb may have an average voltage value equal to an average voltage value of the voltage signal Vout. The voltage signal Vout and the voltage signal Voutb may be complementary to each other. The receiver circuit 10D is mainly different from the receiver circuit 10C in that the receiver circuit 10D further includes an input terminal Tinb and an output terminal Toutb, further includes an inductor 11D and a transimpedance amplifier 12D, and further includes a bypass circuit 13D instead of the bypass circuit 13C. The input terminal Tinb is electrically coupled to the anode of the photodetector PDb. The photocurrent Ipdb is input to the input terminal Tinb. The output terminal Toutb outputs the voltage signal Voutb to the outside of the receiver circuit 10D.

The inductor 11D is an inductor device similar to the inductor 11. The inductor 11D has an inductance L2. The inductance L2 may have a value equal a value of the inductance L1. The inductor 11D includes a terminal 11c and a terminal 11d. The terminal 11c is electrically coupled to the input terminal Tinb. The terminal 11d is electrically coupled to an input node 12c to be described later. For example, the inductor 11D is disposed on a semiconductor chip together with the transimpedance amplifier 12D, and is formed by a metal line on the semiconductor chip. That is, the inductor 11D corresponds to an inductive component of the metal line that electrically connects the input terminal Tinb and the input node 12c. When the inductance L1 having a relatively large value is required, the inductor 11D may be formed as a spiral inductor on the semiconductor chip, for example.

The transimpedance amplifier 12D is a circuit that converts a current signal Iinb into the voltage signal Voutb. The transimpedance amplifier 12D has a configuration similar to that of the transimpedance amplifier 12. The transimpedance amplifier 12D may have a configuration identical to that of the transimpedance amplifier 12. Specifically, the transimpedance amplifier 12D includes a voltage amplifier 21D and a feedback resistor 22D. An input terminal and an output terminal of the voltage amplifier 21D are electrically coupled to each other via the feedback resistor 22D. In other words, the feedback resistor 22D is electrically coupled between the input and output of the voltage amplifier 21D. The current signal Iinb is generated by subtracting bypass currents Iagc1b and Iagc2b from the photocurrent Ipdb. The bypass currents Iagc1b and Iagc2b are adjusted by the bypass circuit 13D. The increase and decrease of the voltage signal Voutb is inverted with respect to the increase and decrease of the current signal Iinb. For example, when the current amount of the current signal Iinb increases, the voltage value of the voltage signal Voutb decreases (becomes low).

The voltage amplifier 21D is, for example, an inverting amplifier circuit. When the voltage Vinb of the input node 12c increases, the voltage signal Voutb decreases, and when the voltage Vinb decreases, the voltage signal Voutb increases. Again of the transimpedance amplifier 12D (a ratio of an amount of change in the voltage signal Voutb to an amount of change in the current signal Iinb) is mainly determined by a resistance (transimpedance) of the feedback resistor 22D. The gain of the transimpedance amplifier 12D is obtained by $\Delta Voutb/\Delta Iinb$, where $\Delta Voutb$ is the amount of change in the voltage signal Voutb, and $\Delta Iinb$ is the amount of change in the current signal Iinb causing the change amount $\Delta Voutb$. An input impedance of the transimpedance amplifier 12D is, for example, about 10Ω to 100Ω.

The transimpedance amplifier 12D includes the input node 12c and an output node 12d. The input node 12c includes a connection point between the input terminal of the voltage amplifier 21D and one end of the feedback resistor 22D. The input node 12c may be the input terminal of the voltage amplifier 21D. That is, the current signal Iinb is input to the input node 12c. The output node 12d includes a connection point between the output terminal of the voltage amplifier 21D and the other end of the feedback resistor 22D. The output node 12d may be the output terminal of the voltage amplifier 21D. That is, the voltage signal Voutb is output from the output node 12d.

The bypass circuit 13D generates the current signal Iin by subtracting the bypass currents Iagc1 and Iagc2 from the photocurrent Ipd, and generates the current signal Iinb by subtracting the bypass currents Iagc1b and Iagc2b from the photocurrent Ipdb. The bypass circuit 13D is mainly different from the bypass circuit 13C in that the bypass circuit 13D further includes a transistor 31D, a transistor 32D, and an impedance adjustment circuit 33D. In FIG. 13, the control circuit 40 generates the control voltage Vagc in accordance with the differential voltage signal corresponding to a difference between the voltage signal Vout and the voltage signal Voutb. Specifically, the control circuit 40 detects the amplitudes of the differential voltage signal consisting of the voltage signal Vout and the voltage signal Voutb, and generates the control voltage Vagc in accordance with the amplitude. For example, the control circuit 40 increases the voltage value of the control voltage Vagc as the amplitudes of the differential voltage signal (Vout, Voutb) increases. The control circuit 40 outputs the control voltage Vagc to the gate of the transistor 31, the gate of the transistor 32, a gate of the transistor 31D, and a gate of the transistor 32D. The amplitudes of the differential voltage signal (Vout, Voutb) correspond to the peak value of the difference voltage between the voltage signal Vout and the voltage signal Voutb. The bypass circuit 13D can perform an automatic gain control (AGC) by changing the bypass currents Iagc1, Iagc2, Iagc1b, and Iagc2b in accordance with the differential voltage signal (Vout, Voutb). For example, when the photocurrents Ipd and Ipdb become larger than a predetermined value, the bypass currents Iagc1, Iagc2, Iagc1b, and Iagc2b are increased to suppress an increase in the current signals Iin and Iinb. When the photocurrents Ipd and Ipdb are smaller than a predetermined value, the bypass currents Iagc1, Iagc2, Iagc1b and Iagc2b become zero, and the pair of the current signals Iin and Iinb become equal to the pair of photocurrents Ipd and Ipdb. Since the gain control circuit may be constructed using prior arts, a detailed description thereof will be omitted.

The transistors 31D and 32D are, for example, field-effect transistors having a MOS structure. In the present modification, N-channel MOS transistors are used as the transistors 31D and 32D. The transistor 31D is electrically coupled between the terminal 11c of the inductor 11D and the bias circuit 34. Specifically, a drain of the transistor 31D is electrically coupled to the terminal 11c of the inductor 11D. A source of the transistor 31D is electrically coupled to the bias circuit 34 via the impedance adjustment circuit 33D. The gate of the transistor 31D is electrically coupled to the control circuit 40. The control voltage Vagc is supplied to the gate of the transistor 31D.

The transistor 32D is electrically coupled between the terminal 11d of the inductor 11D and the bias circuit 34. In particular, a drain of the transistor 32D is electrically coupled to the terminal 11d of the inductor 11D. A source of the transistor 32D is electrically coupled to the bias circuit 34. The gate of the transistor 32D is electrically coupled to the control circuit 40. The control voltage Vagc is supplied to the gate of the transistor 32D. The size (gate width) of the transistors 31, the size (gate width) of the transistors 32, a size (gate width) of the transistors 31D, and a size (gate width) of the transistors 32D may be the same or different from each other.

The impedance adjustment circuit 33D has a configuration similar to that of the impedance adjustment circuit 33. To be specific, the impedance adjustment circuit 33D includes a resistor 35D and a capacitor 36D, and is a circuit in which the resistor 35D and the capacitor 36D are connected in parallel. The impedance adjustment circuit 33D is connected in series to the transistor 31D. In the present modification, the impedance adjustment circuit 33D is electrically coupled between the transistor 31D and the bias circuit 34. The impedance adjustment circuit 33D includes a node 33c and a node 33d. The node 33c is a connection point between one end of the resistor 35D and one end of the capacitor 36D. The node 33d is a connection point between the other end of the resistor 35D and the other end of the capacitor 36D. The node 33c is electrically coupled to the source of the transistor 31D. The node 33d is electrically coupled to the bias circuit 34. A resistance R3 of the resistor 35D is sufficiently larger than the input impedance of the transimpedance amplifier 12D (input node 12c), and is set to, for example, several hundreds Ω to several kΩ. A capacitance C3 of the capacitor 36D is set to, for example, several tens fF to several hundreds fF. A method of determining the resistance R3 and the capacitance C3 is similar to the method of determining the resistance R1 and the capacitance C1.

Also in the receiver circuit 10D, effects similar to those of the receiver circuit 10C are achieved. The optical receiver 1D can also be constructed using two receiver circuits 10C shown in FIG. 12. In the receiver circuit 10D, the number of the bias circuit 34 and the control circuit 40 is reduced to one as compared with the configuration using two receiver circuits 10C. This makes it possible to reduce the power consumption of the optical receiver 1D and the receiver circuit 10D.

A differential-type transimpedance amplifier may be used instead of the transimpedance amplifier 12 and the transimpedance amplifier 12D. For example, the differential-type transimpedance amplifier has a non-inverting input node and an inverting input node. The input terminal Tin is electrically coupled to the non-inverting input node through the inductor 11, and the input terminal Tinb is electrically coupled to the inverting input node through the inductor 11D. The differential-type transimpedance amplifier further includes a non-inverting output node and an inverting output node. The non-inverting output node is electrically coupled to the output terminal Tout, and the inverting output node is electrically coupled to the output terminal Toutb. The differential-type transimpedance amplifier generates the differential voltage signal as a difference between the voltage signal Vout and the voltage signal Voutb in accordance with a difference between the current signal Iin input to the non-inverting input node and the current signal Iinb input to the inverting input node. The bias circuit 34 is shared by the positive-phase circuit (the transistors 31, 32, and the impedance adjustment circuit 33) and the negative-phase circuit (the transistors 31D, 32D, and the impedance adjustment circuit 33D) included in the bypass circuit 13D. However, the bias circuit 34 may be individually provided for each of the positive-phase circuit and the negative-phase circuit.

In each of the receiver circuits 10, 10A, 10B, and 10C, the same control voltage Vagc is supplied to the transistors 31 and 32, different control voltages Vagc may be supplied thereto. In the receiver circuit 10D, the same control voltage Vagc is supplied to the transistors 31, 31D, 32, and 32D, but different control voltages Vagc may be supplied to the transistors.

In the receiver circuits 10, 10B, 10C, and 10D, the impedance adjustment circuit 33 may be electrically coupled between the terminal 11a and the transistor 31. Similarly, in the receiver circuits 10A and 10B, the impedance adjustment circuit 37 may be electrically coupled between the terminal 11b and the transistor 32. In the receiver circuit 10D, the impedance adjustment circuit 33D may be electrically coupled between the terminal 11c and the transistor 31D.

In the receiver circuits 10, 10A, 10B, 10C, and 10D, another configuration that functions as a variable resistor may be adopted instead of the transistor 31, and another configuration that functions as a variable resistor may be adopted instead of the transistor 32. Similarly, in the receiver circuit 10D, another configuration that functions as a variable resistor may be adopted instead of the transistors 31D and 32D. For example, the transistors 31, 31D, 32, and 32D may be bipolar transistors. In this case, the terms "gate", "source", and "drain", may be read as a base, an emitter, and a collector, respectively.

What is claimed is:

1. A receiver circuit configured to generate a voltage signal in accordance with an input current signal, the receiver circuit comprising:
    an input terminal for receiving the input current signal;
    a transimpedance amplifier having an input node, the transimpedance amplifier being configured to convert a current signal into the voltage signal, the current signal being input to the input node;
    an inductor having a first terminal and a second terminal, the first terminal being coupled to the input terminal, the second terminal being coupled to the input node; and
    a bypass circuit including:
    a bias circuit configured to supply a bias voltage,
    a first variable resistor coupled between the first terminal and the bias circuit,
    a second variable resistor coupled between the second terminal and the bias circuit, and
    an impedance adjustment circuit including a resistor and a capacitor connected in parallel to the resistor, the impedance adjustment circuit being connected in series to at least one of the first variable resistor and the second variable resistor,
    wherein the impedance adjustment circuit has a cut-off frequency smaller than a half of a peak frequency, and
    the receiver circuit converts the input current signal into the voltage signal with a conversion efficiency which becomes maximum at the peak frequency available when the one of the first variable resistor and the second variable resistor is set to an OFF state and the other of the first variable resistor and the second variable resistor is set to an ON state.

2. The receiver circuit according to claim 1, wherein the impedance adjustment circuit is connected in series to the first variable resistor.

3. The receiver circuit according to claim 2, wherein the impedance adjustment circuit is connected between the first variable resistor and the bias circuit.

4. The receiver circuit according to claim 1,
wherein the first variable resistor has a first resistance changed in accordance with a control signal, and
the second variable resistor has a second resistance changed in accordance with the control signal.

5. The receiver circuit according to claim 4, further comprising
a control circuit configured to generate the control signal in accordance with the voltage signal.

6. The receiver circuit according to claim 1, wherein the resistor has a resistance larger than an input impedance of the input node.

7. The receiver circuit according to claim 1, wherein the bias voltage is set to an average value of an input voltage at the input node.

8. A receiver circuit configured to generate a voltage signal in accordance with an input current signal, the receiver circuit comprising:
an input terminal for receiving the input current signal;
a transimpedance amplifier having an input node, the transimpedance amplifier being configured to convert a current signal into the voltage signal, the current signal being input to the input node;
an inductor having a first terminal and a second terminal, the first terminal being coupled to the input terminal, the second terminal being coupled to the input node; and
a bypass circuit including:
a bias circuit configured to supply a bias voltage,
a first variable resistor coupled between the first terminal and the bias circuit,
a second variable resistor coupled between the second terminal and the bias circuit, and
an impedance adjustment circuit having a first node and a second node, the impedance adjustment circuit including a resistor and a capacitor, the resistor being connected between the first node and the second node, the capacitor being connected between the first node and the second node, the first node being connected to at least one of the first variable resistor and the second variable resistor, the second node being connected to the bias circuit.

9. The receiver circuit according to claim 8, wherein the first node is connected to the first variable resistor.

10. The receiver circuit according to claim 8,
wherein the first variable resistor has a first resistance changed in accordance with a control signal, and
the second variable resistor has a second resistance changed in accordance with the control signal.

11. The receiver circuit according to claim 10, further comprising a control circuit configured to generate the control signal in accordance with the voltage signal.

12. The receiver circuit according to claim 8, wherein the resistor has a resistance larger than an input impedance of the input node.

13. The receiver circuit according to claim 8, wherein the bias voltage is set to an average value of an input voltage at the input node.

* * * * *